(12) United States Patent
Friedholm et al.

(10) Patent No.: US 11,810,166 B2
(45) Date of Patent: *Nov. 7, 2023

(54) SYSTEMS AND METHODS FOR MANAGING EMPLOYEE-LIABLE EXPENSES

(71) Applicant: Cass Information Systems, Inc., Bridgeton, MO (US)

(72) Inventors: Carl N. Friedholm, Greer, SC (US); Angela Melissa Taylor, Inman, SC (US)

(73) Assignee: CASS INFORMATION SYSTEMS, INC., Bridgeton, MO (US)

(*) Notice: Subject to any disclaimer, the term of this patent is extended or adjusted under 35 U.S.C. 154(b) by 0 days.

This patent is subject to a terminal disclaimer.

(21) Appl. No.: 17/930,697

(22) Filed: Sep. 8, 2022

(65) Prior Publication Data

US 2023/0005030 A1    Jan. 5, 2023

Related U.S. Application Data

(60) Continuation of application No. 17/071,842, filed on Oct. 15, 2020, now Pat. No. 11,488,217, which is a continuation of application No. 15/975,261, filed on May 9, 2018, now Pat. No. 10,839,434, which is a division of application No. 13/740,929, filed on Jan. 14, 2013, now Pat. No. 9,978,087, which is a continuation-in-part of application No. 13/469,341, filed on May 11, 2012, now Pat. No. 8,744,935.

(60) Provisional application No. 61/605,008, filed on Feb. 29, 2012.

(51) Int. Cl.
*G06Q 30/04* (2012.01)
*G06Q 40/12* (2023.01)

(52) U.S. Cl.
CPC ............ *G06Q 30/04* (2013.01); *G06Q 40/12* (2013.12)

(58) Field of Classification Search
CPC .............................. G06Q 30/04; G06Q 40/12
USPC .......................................................... 705/34
See application file for complete search history.

(56) References Cited

U.S. PATENT DOCUMENTS

| 5,699,528 A | 12/1997 | Hogan |
| 6,058,380 A | 5/2000 | Anderson et al. |
| 7,340,422 B2 * | 3/2008 | Fisher .................. G06Q 20/102 705/40 |

(Continued)

*Primary Examiner* — Garcia Ade
(74) *Attorney, Agent, or Firm* — Armstrong Teasdale LLP

(57) ABSTRACT

A method for managing payments made as part of an employee-liable expense reimbursement program is described. A plurality of employees are enrolled in the program and submit requests for reimbursement for expenses related to a service provided to the employees by a service provider for which the employees are liable. The method includes receiving, by the computer system, requests for reimbursement and aggregating the requests for reimbursement scheduled for payment within a predefined time period and associated with the service provider. The method also includes generating an invoice that includes a payment amount to be paid to the employee for subsequent payment to the service provider. The method also includes automatically requesting funds from an employer of the plurality of employees for the payment amount included in the invoice and electronically transferring funds associated with the employer to the service provider or alternatively, to the employee for subsequent payment to the service provider.

20 Claims, 13 Drawing Sheets

(56) References Cited

U.S. PATENT DOCUMENTS

| | | | |
|---|---|---|---|
| 7,389,286 B2 * | 6/2008 | Holmes | G06Q 40/12 |
| 7,509,288 B2 | 3/2009 | Bennett et al. | |
| 7,805,342 B2 | 9/2010 | Fisher | |
| 2004/0172360 A1 * | 9/2004 | Mabrey | G06Q 20/102 |
| | | | 705/40 |
| 2006/0089891 A1 | 4/2006 | Nigam | |
| 2007/0168234 A1 * | 7/2007 | Rutkowski | G06Q 40/08 |
| | | | 705/4 |
| 2008/0285733 A1 | 11/2008 | Fisher | |
| 2010/0017316 A1 * | 1/2010 | Joseph | G06Q 10/10 |
| | | | 705/30 |
| 2011/0258005 A1 * | 10/2011 | Fredericks | G06Q 10/02 |
| | | | 705/5 |
| 2012/0059745 A1 | 3/2012 | Fredericks et al. | |

* cited by examiner

SYSTEMS AND METHODS FOR MANAGING EMPLOYEE-LIABLE EXPENSES

CROSS REFERENCE TO RELATED APPLICATIONS

This is a continuation of U.S. patent application Ser. No. 17/071,842, filed Oct. 15, 2020, which is a continuation of U.S. patent application Ser. No. 15/975,261, filed May 9, 2018, which in turn is a divisional of U.S. patent application Ser. No. 13/740,929, filed Jan. 14, 2013, which is in turn a continuation-in-part of U.S. patent application Ser. No. 13/469,341, filed May 11, 2012, which in turn claims the benefit of U.S. Provisional Application No. 61/605,008, filed Feb. 29, 2012, all of which are hereby incorporated by reference in their entirety.

BACKGROUND OF THE INVENTION

The embodiments described herein relate generally to methods and systems for managing payment of bills, and more specifically to network-based systems and methods for managing expenses related to services provided to an employee by a service provider for which the employee is liable, wherein the employer provides a benefit to the employee by paying at least a portion of the incurred expenses directly to the service provider or alternatively directly to the employee.

Use of mobile communication devices has become increasingly common. For example, mobile devices facilitate communication with an employee of a corporation even when the employee is away from the corporation's offices. For this and other reasons, corporations may desire use of mobile devices by employees. Costs associated with mobile devices include the cost of the mobile device (i.e., equipment costs) and the cost of the mobile service (i.e., a cellular usage plan). The cellular usage plan may include a talk portion and a data portion. For example, the plan may provide a user, for a first set monthly price, with an allotment of X minutes of talk time using the mobile device and of Y bytes of data transmission/reception. The cost of the data plan may be included within the first set monthly price or a separate data plan price.

It may be advantageous for the corporation to own the mobile devices used by their employees and/or to pay for the service. These costs may be referred to as a corporation-liable expense. Many companies enroll their employees in a company-wide shared cellular usage plan provided by a cellular service provider. Billing is simplified by having all of the employees enrolled with a single cellular service provider. An employee also can be required to return the mobile device to the corporation upon termination of their employment with the corporation if the corporation owns the mobile device. Furthermore, the corporation may be entitled to delete data stored on the mobile device upon termination of the employment if the corporation owns the mobile device. Maintaining control of the equipment and data is beneficial to the corporation; however, the corporation may not be able to meet employee requests for access to different types of equipment and service provided by different cellular phone service providers. Furthermore, typically the corporation is responsible for customer service, provisioning of the mobile devices, and other support functions related to a corporate owned and paid mobile phone service.

To satisfy employee requests for choice in their mobile device and/or plan, the corporation may provide employees with a mobile phone benefit. For example, the corporation may agree to pay for an employee's mobile usage plan; however, ultimately the employee is liable to a mobile service provider (i.e., an employee-liable expense). The corporation may reimburse the employee upon receipt of a reimbursement request from the employee. Manual entry and processing of the reimbursement requests is burdensome and does not provide an inventory of mobile devices being paid for by the corporation. Furthermore, there is no connection between the reimbursement requests and a human resources department of the corporation, where, for example, records of the corporation's agreements regarding payment of employee mobile expenses and a current employee status typically are maintained.

Alternatively, the corporation may provide the employee with a monthly stipend included in a pay check and earmarked for payment of mobile phone expenses. Reimbursement of mobile phone expenses in this manner does not provide the corporation with an inventory of mobile devices and also does not provide a connection between requests for reimbursement and the corporation's human resources department. Furthermore, an employee stipend of this sort may have negative tax consequences when compared to payments made by the corporation in response to a reimbursement request. For example, an employee stipend may be taxed as income to the employee. In contrast, a payment made by the corporation in response to a reimbursement request may be designated as a business expense. However, by paying for the mobile device expenses, the corporation may maintain the right to delete data stored on the mobile device of an employee upon termination of the employee.

Accordingly, it is desirable to have a network-based system and method of managing employee-liable expenses by an employer that will address the disadvantages of the known systems described above.

BRIEF DESCRIPTION OF THE INVENTION

In one embodiment, a computer-based method is provided, for managing payments made as part of an employee-liable expense reimbursement program, wherein a plurality of employees are enrolled in the program and submit requests for reimbursement for expenses related to a service provided to the employees by a service provider for which the employees are liable. The method is implemented using a computer system that includes a processor and a memory device. The method includes receiving, by the computer system, requests for reimbursement. The method further includes aggregating the requests for reimbursement scheduled for payment within a predefined time period and associated with the service provider. The method further includes generating an invoice that includes a payment amount to be paid to first service provider. The method further includes automatically requesting funds from an employer of the plurality of employees for the payment amount included in the invoice. The method further includes electronically transferring funds associated with the employer to one of the service provider and the employee.

In another embodiment, one or more non-transitory computer-readable storage media having computer-executable instructions embodied thereon are provided. When executed by at least one processor, the computer-executable instructions cause the processor to receive requests for reimbursement from employees enrolled in an employee-liable expense reimbursement program. The computer-executable instructions further cause the processor to aggregate the requests for reimbursement scheduled for payment within a predefined time period and associated with the service provider. The computer-executable instructions further cause the processor to generate an invoice that includes a payment amount to be paid to first service provider. The computer-executable instructions further cause the processor to automatically request funds from an employer of the plurality of employees for the payment amount included in the invoice. The computer-executable instructions further cause the processor to electronically transfer funds associated with the employer to one of the service provider and the employee.

In yet another embodiment, a computer system is provided for managing payments made as part of an employee-liable expense reimbursement program, wherein a plurality of employees are enrolled in the program and submit requests for reimbursement for expenses related to services provided to the employees by a service provider for which the employees are liable. The computer system includes a processor and a memory device. The processor is operable to execute instructions stored in the memory device causing the processor to receive requests for reimbursement from employees enrolled in an employee-liable expense reimbursement program. The computer-executable instructions further cause the processor to aggregate the requests for reimbursement scheduled for payment within a predefined time period and associated with the service provider. The computer-executable instructions further cause the processor to generate an invoice that includes a payment amount to be paid to first service provider. The computer-executable instructions further cause the processor to automatically request funds from an employer of the plurality of employees for the payment amount included in the invoice. The computer-executable instructions further cause the processor to electronically transfer funds associated with the employer to one of the service provider and the employee.

DETAILED DESCRIPTION OF THE INVENTION

Figure 1:
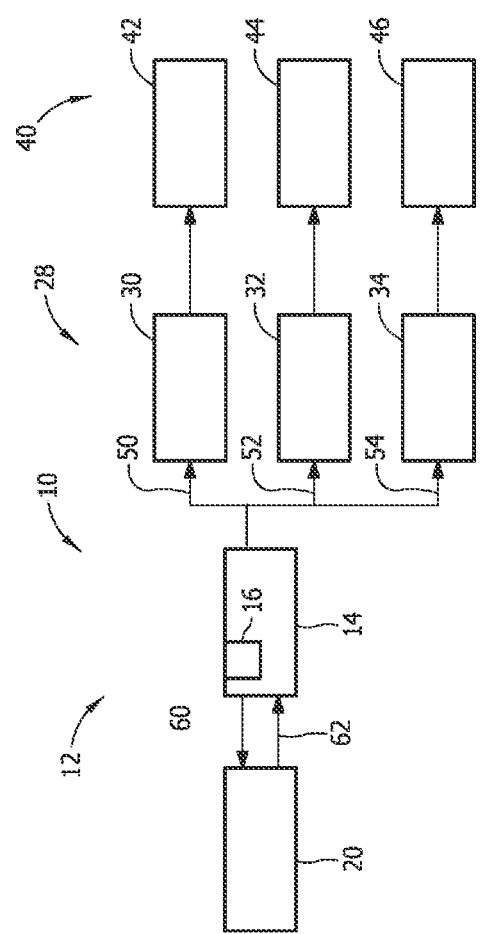
FIG. 1 is a schematic diagram illustrating an exemplary multi-party payment system that includes an expense manager.

The methods and systems for managing payment of employee-liable expenses described herein allow a payment to be made by an employer, or on behalf of an employer, to a service provider to which an employee is liable, or optionally to the employee directly. The payment is made by the employer as a benefit to the employee. More specifically, the methods and systems described herein facilitate, for example, distributing payments from the employer directly to accounts with a service provider for which the employee is liable, or optionally, directly to an employee. In the exemplary embodiment, an expense manager receives data from the employer and data from the employee, enrolls the employee in a reimbursement program, generates an invoice for employer approval, and distributes a payment to the service provider. The expense manager utilizes an expense management system to perform the processes described herein. In some embodiments, the expense manager is a separate entity from the employer, that is, a third-party who provides expense management services. In other embodiments, the functions of the expense manager and the expense management system are included within, and performed by, the employer. The expense management system provides the employer with reports of employee-liable expenses paid by the employer and an inventory of employee-liable devices. The methods and systems described herein allow an employer to provide a reimbursement benefit associated with employee-liable devices and provide the employer with an inventory and records typically only available to an employer with respect to employer-liable devices. In a specific example, the employee-liable reimbursement program described herein allows an employer to provide a mobile phone benefit to employees, without assuming responsibilities for customer service and/or support functions, and while employees are able to choose service providers, devices, plans, and/or features.

In a specific embodiment, the systems and processes described herein credit an employee's personal account with a service provider for use of a personal mobile device. A technical effect of the systems and processes described herein include at least one of: (a) receiving, by the computer system, requests for reimbursement; (b) aggregating the requests for reimbursement scheduled for payment within a predefined time period and associated with the service provider; (c) generating an invoice that includes a payment amount to be paid to a first service provider; (d) automatically requesting funds from an employer of the plurality of employees for the payment amount included in the invoice;

(e) electronically transferring funds associated with the employer to one of the service provider and the employee; (f) transferring funds directly to the employee; (g) receiving, by the computer system, approval of the invoice from the employer; (h) storing a reimbursement record for each of the plurality of employees enrolled in the program, wherein the reimbursement record includes at least one of a reimbursement amount, an employee account identifier, and a service provider account identifier; (i) generating the invoice based at least partially on the reimbursement amounts included within the reimbursement records; (j) including within the generated invoice details as to a portion of the payment amount to be paid to the service provider associated with each employee of the plurality of employees; (k) providing data to the employer that identifies a portion of the payment amount associated with at least one of a cost center within the employer and a geographic location of the employees; (l) providing the data to the employer comprises providing the employer with access to a webpage, wherein the webpage provides the employer with options on how to organize the data associated with the employer that is stored by the memory device; (m) providing the invoice to the employer; (n) transmitting the invoice to the employer, wherein the invoice has a predefined format that is compatible with software utilized by the employer; (o) providing the employer with access to the invoice, wherein the invoice has a predefined format that is compatible with software utilized by the employer; (p) receiving, by the computer system, data associated with a request for reimbursement from an employee of the plurality of employees; (q) generating, by the computer system, a request for reimbursement based at least partially on the data received from the employee; (r) requesting approval, from the employer, of the request for reimbursement; (s) receiving approval of the request for reimbursement; and (t) initiating recurring reimbursement program payments for approved requests for reimbursement.

In one embodiment, a computer program is provided, and the program is embodied on a computer-readable medium and utilizes a Structured Query Language (SQL) with a client user interface front-end for administration and a web interface for standard user input and reports. In an exemplary embodiment, the system is web enabled and is run on a business-entity intranet. In yet another embodiment, the system is fully accessed by individuals having an authorized access outside the firewall of the business-entity through the Internet. In a further exemplary embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

The systems and methods are not limited to the specific embodiments described herein. In addition, components of each system and each method can be practiced independent and separate from other components and methods described herein. Each component and method also can be used in combination with other components and processes.

FIG. 1 is a schematic diagram 10 illustrating an exemplary multi-party payment system 12 that includes an expense manager 14. Expense manager 14 enables payment of employee-liable expenses by an employer, for example, employer 20. In the exemplary embodiment, expense manager 14 includes an expense management system 16 configured to perform the processes described herein. Furthermore, in the exemplary embodiment, expense manager 14 is a separate entity from employer 20, that is, a third-party who provides expense management services. In an alternative embodiment, the functions of expense manager 14 and expense management system 16 are included within, and performed by, employer 20. Payment system 12 also includes a plurality of service providers 28, for example, a first service provider 30, a second service provider 32, and a third service provider 34. Although illustrated as including three service providers, payment system 12 may include any suitable number of service providers that allows payment system 12 to function as described herein.

Employer 20 may include a corporation, a charitable group, and/or any other organization that employs a plurality of employees 40. Furthermore, the employees 40 may be independent contractors or in a similar relationship with employer 20. As part of an agreement with employees 40 (e.g., as part of an employment agreement), employer 20 may agree to reimburse at least a portion of an employee-liable expense. Examples of employee-liable expenses include, but are not limited to, mobile phone expenses, auto loan/lease expenses, internet service provider expenses, and/or any other repeating expense that an employee may be contractually obliged to pay that may also relate to or be used as part of the employee's employment. In the exemplary embodiment, a first employee 42 of the plurality of employees 40 is a party to a contract with first service provider 30. For example, first service provider 30 may be a first cellular service provider. First employee 42 may be enrolled in a mobile device usage plan offered by first service provider 30 and required to pay for the mobile device usage plan on a monthly basis.

In the exemplary embodiment, a second employee 44 of the plurality of employees 40 is a party to a contract with second service provider 32. Furthermore, a third employee 46 of the plurality of employees 40 is a party to a contract with third service provider 34. Although illustrated as including three employees each being a party to a contract with a different service provider, the plurality of employees 40 may include any number of employees being party to contracts with any number of different service providers. Typically, payment system 12 will include a first plurality of employees having contracts with first service provider 30, a second plurality of employees having contracts with second service provider 32, and a third plurality of employees having contracts with third service provider 34. In the exemplary embodiment, employer 20 agrees to reimburse each of employees 40 for an employee-liable expense, but does not limit the service provider the employee is able to select to provide the service associated with the expense. Alternatively, the plurality of employees 40 may select from a list of approved service providers provided by employer 20.

In the exemplary embodiment, expense management system 16 allows employer 20 to offer an employee-liable reimbursement program to employees 40. In the exemplary embodiment, expense management system 16 provides the option to employees 40, to have reimbursements paid directly to service providers 28, or directly to employees 40, for example via direct deposit to accounts associated with employees 40. In one embodiment, the right to exercise the option resides with employer 20. In another embodiment, employees 40 individually have the right to choose to be reimbursed directly. In addition, in one embodiment, expense management system 16 is configured so that for some of employees 40, reimbursements are made directly to one or more service providers 28, and for others of employees 40, reimbursements are made directly to those employees 40. Once first employee 42 is enrolled in the employee-liable reimbursement program, expense management system 16 administers a periodic distribution of payments 50 directly to first service provider 30, and more specifically, directly to an account with first service provider 30 associated with first employee 42. In the exemplary embodiment, the payments are distributed to first service provider 30 via ACH/CTX payment transactions. An amount and frequency of payments 50 is predetermined based on a reimbursement level in which first employee 42 is eligible. The reimbursement level is defined based on policies developed by employer 20. Although described herein as a reimbursement for an employee-liable expense, payments made by expense manager 14 may also be referred to as a credit to the account with first service provider 30 associated with first employee 42, in a situation in which the option to have payments made directly to first service provider 30 has been exercised.

Similarly, once second employee 44 is enrolled in the employee-liable reimbursement program, expense management system 16 administers a periodic distribution of payments 52 directly to second service provider 32, and more specifically, directly to an account with second service provider 32 associated with second employee 44, or to second employee 44 (for example to an account associated with second employee 44), if that option is being exercised. Furthermore, once third employee 46 is enrolled in the employee-liable reimbursement program, expense management system 16 administers a periodic distribution of payments 54 directly to third service provider 34, and more specifically, directly to an account with third service provider 34 associated with third employee 46. Alternatively, if the option for direct payment to employees 40 is exercised, expense management system 16 administers periodic distribution of payments directly to one or more of employees 42, 44, and/or 46.

In the exemplary embodiment, expense management system 16 provides employer 20 with at least one report 60. Report 60 may include, but is not limited to, a status of payments made to service providers 28, an amount paid to one or more of service providers 28 and/or one or more of employees 42-46, and amounts reimbursed for each of employees 40. Furthermore, report 60 provides an accounting of each payment made by expense management system 16 and other reporting functions necessary for auditing the validity of each payment. For example, report 60 may be included within an automated general ledger upload file for recording employee-liable reimbursement program payments.

In the exemplary embodiment, report 60 also includes an inventory and monthly validation of employee-liable devices (also referred to as individual responsibility units (IRUs)) and accounts. For example, the inventory of employee-liable devices provides a list of mobile phone numbers associated with these employee-liable devices that is typically unavailable to employer 20.

In the exemplary embodiment, expense manager 14 requests funds 62, to be paid to one or more of service providers 28 and/or one or more of employees 40, from employer 20. Funds 62 either reimburses expense manager 14 for payments made to service providers 28, or provide expense manager 14 with the money to be paid to service providers 28. Funds 62 may also include a fee charged by expense manager 14 for use of expense management system 16. In the exemplary embodiment, funds 62 are electronically requested and employer 20 is also provided with an automated general ledger upload file for recording the employee-liable payments. After approving the funds request, employer 20 transfers funds 62 to expense manager 14.

In the exemplary embodiment, expense management system 16 matches payments, for example, payments 50, 52, and 54, to human resource records provided by employer 20 to ensure payments are made only on behalf of, and/or to, valid employees. Furthermore, matching payments 50, 52, and 54 to human resource records ensures employees 42, 44, and 46 remain eligible for the level of reimbursement provided by payments 50, 52, and 54.

Figure 2:
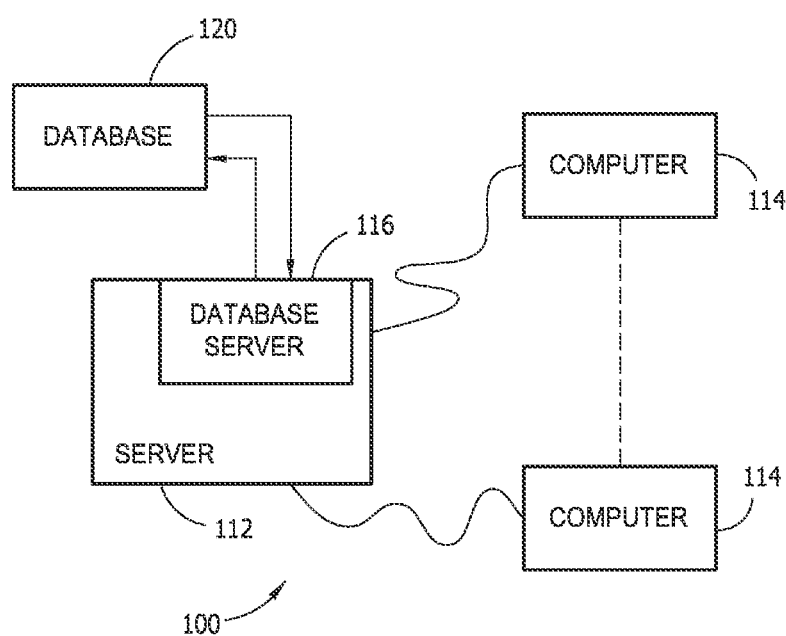
FIG. 2 is a simplified block diagram of an exemplary embodiment of server architecture of an expense management system for processing of employee-liable expenses, in accordance with one embodiment of the present invention.

FIG. 2 is a simplified block diagram of an exemplary system 100 in accordance with one embodiment of the present invention. System 100 is configured to implement the data flow shown in FIG. 1. In one embodiment, system 100 is an expense management system, for example, expense management system 16 (shown in FIG. 1), used to facilitate distribution of payments from an employer directly to a service provider, and more specifically, directly to accounts with the service provider for which an employee is liable, and/or to employees. In addition, system 100 is operable as a reporting and inventory system, which can be utilized by employer 20 (shown in FIG. 1) to monitor expenses related to employee-liable devices.

More specifically, in the exemplary embodiment, system 100 includes a server system 112, and a plurality of client sub-systems, also referred to as client systems 114, connected to server system 112. In one embodiment, client systems 114 are computers including a web browser, such that server system 112 is accessible to client systems 114 using the Internet. Client systems 114 are interconnected to the Internet through many interfaces including a network, such as a local area network (LAN) or a wide area network (WAN), dial-in-connections, cable modems and special high-speed ISDN lines. Client systems 114 could be any device capable of interconnecting to the Internet including a web-based phone, personal digital assistant (PDA), or other web-based connectable equipment. A database server 116 is connected to a database 120 or other memory device containing information on a variety of matters, as described below in greater detail. In one embodiment, centralized database 120 is stored on server system 112 and can be accessed by potential users at one of client systems 114 by logging onto server system 112 through one of client systems 114. In an alternative embodiment, database 120 is stored remotely from server system 112 and may be non-centralized.

Database 120 stores employer-provided data and employee-provided data related to an employee-liable device reimbursement program, including, but not limited to, a list of employees eligible to participate in the employee-liable device reimbursement program provided by the employer, eligibility requirements for reimbursement at a plurality of reimbursement levels, an employee-liable device identifier provided by the employee, and a service provider identifier provided by the employee. Database 120 may also be utilized to store records of distributions made as part of the employee-liable device reimbursement program and employee-liable device inventory data including, but not limited to, device identifiers.

Figure 3:
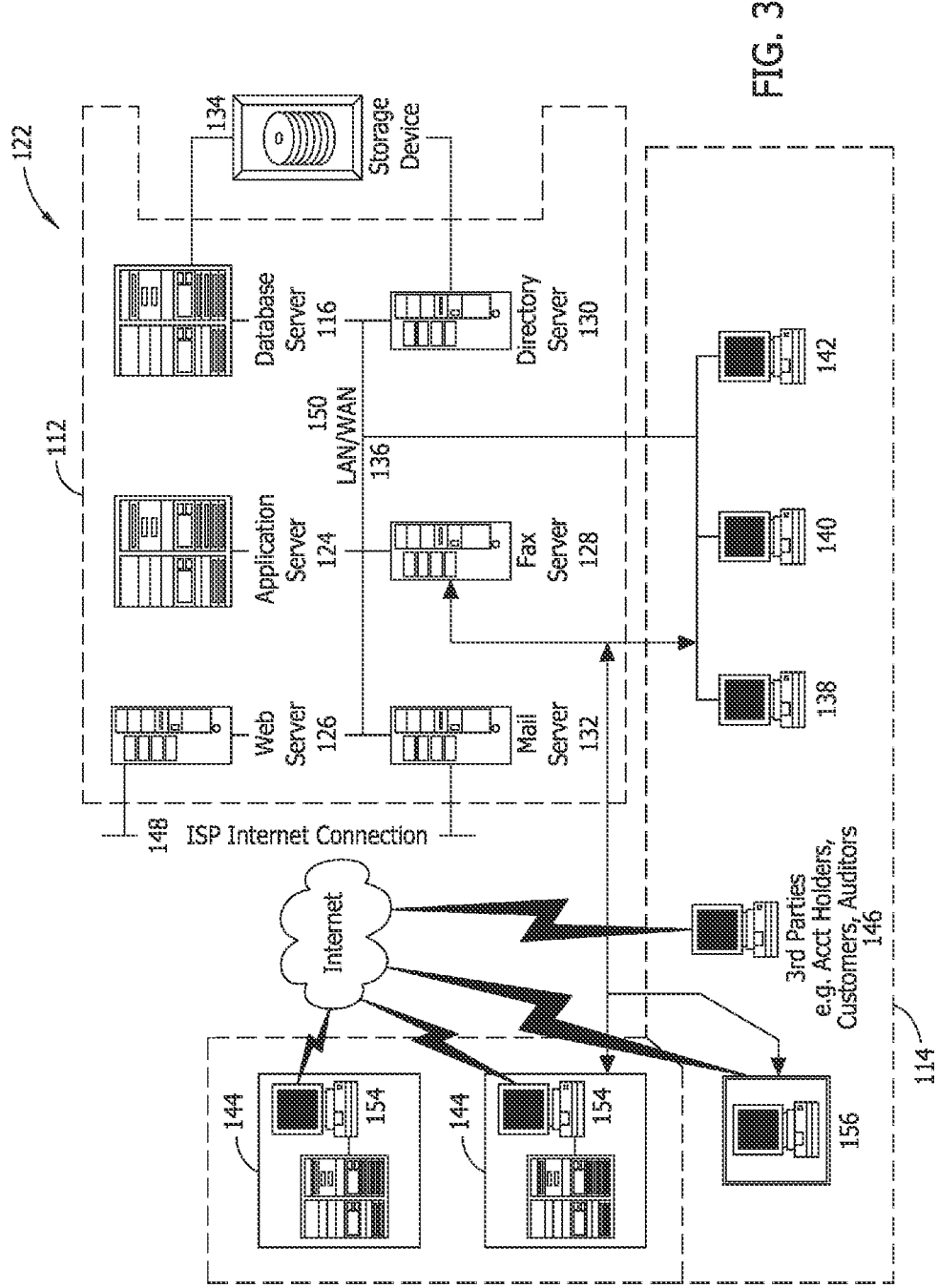
FIG. 3 is an expanded block diagram of an exemplary embodiment of server architecture of the expense management system shown in FIG. 2.

FIG. 3 is an expanded block diagram of an exemplary embodiment of a server architecture of a system 122 in accordance with one embodiment of the present invention. Components in system 122, identical to components of system 100 (shown in FIG. 2), are identified in FIG. 3 using the same reference numerals as used in FIG. 2. System 122 includes server system 112 and client systems 114. Server system 112 further includes database server 116, an application server 124, a web server 126, a fax server 128, a directory server 130, and a mail server 132. A disk storage device 134 is coupled to database server 116 and directory server 130. Servers 116, 124, 126, 128, 130, and 132 are coupled in a local area network (LAN) 136. In addition, a system administrator's workstation 138, a user workstation 140, and a supervisor's workstation 142 are coupled to LAN 136. Alternatively, workstations 138, 140, and 142 are coupled to LAN 136 using an Internet link or are connected through an Intranet.

Each of workstations 138, 140, and 142 may be any computing device that includes a web browser, for example, but not limited to, a personal computer, a laptop computer, a tablet computer, and/or a mobile phone. Although the functions performed at the workstations typically are illustrated as being performed at respective workstations 138, 140, and 142, such functions can be performed at one of many computing devices coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties, e.g., account holders, customers, auditors, etc., 146 using an interne service provider (ISP) Internet connection 148. The communication in the exemplary embodiment is illustrated as being performed using the Internet, however, any other wide area network (WAN) type communication can be utilized in other embodiments, i.e., the systems and processes are not limited to being practiced using the Internet. In addition, and rather than WAN 150, LAN 136 could be used in place of WAN 150.

In the exemplary embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including a client system 156 using a telephone link. Fax server 128 is configured to communicate with other client systems 138, 140, and 142 as well.

Figure 4:
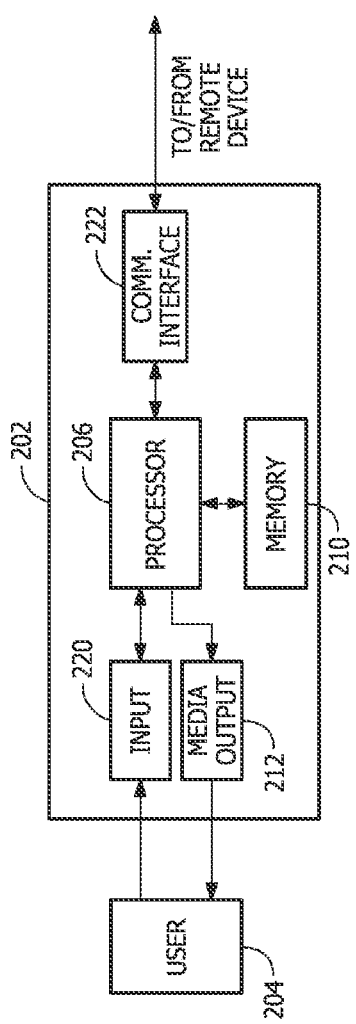
FIG. 4 illustrates an exemplary configuration of a client system shown in FIGS. 2 and 3.

FIG. 4 illustrates an exemplary configuration of a user computing device 202 operated by a user 204. User computing device 202 may include, but is not limited to, client systems 114, 138, 140, and 142, workstation 154, and manager workstation 156. User computing device 202 includes a processor 206 for executing instructions. In some embodiments, executable instructions are stored in a memory area 210. Processor 206 may include one or more processing units (e.g., in a multi-core configuration). Memory area 210 is any device allowing information such as executable instructions and/or written works to be stored and retrieved. Memory area 210 may include one or more computer readable media.

User computing device 202 also includes at least one media output component 212 for presenting information to user 204. Media output component 212 is any component capable of conveying information to user 204. In some embodiments, media output component 212 includes an output adapter such as a video adapter and/or an audio adapter. An output adapter is operatively coupled to processor 206 and operatively coupleable to an output device such as a display device (e.g., a liquid crystal display (LCD), organic light emitting diode (OLED) display, or "electronic ink" display) or an audio output device (e.g., a speaker or headphones).

In some embodiments, user computing device 202 includes an input device 220 for receiving input from user 204. Input device 220 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 212 and input device 220.

User computing device 202 may also include a communication interface 222, which is communicatively coupleable to a remote device such as server system 112. Communication interface 222 may include, for example, a wired or wireless network adapter or a wireless data transceiver for use with a mobile phone network (e.g., Global System for Mobile communications (GSM), 3G) or other mobile data network (e.g., Worldwide Interoperability for Microwave Access (WIMAX)).

Stored in memory area 210 are, for example, computer readable instructions for providing a user interface to user 204 via media output component 212 and, optionally, receiving and processing input from input device 220. A user interface may include, among other possibilities, a web browser and client application. Web browsers enable users, such as user 204, to display and interact with media and other information typically embedded on a web page or a website from server system 112. A client application allows user 204 to interact with a server application from server system 112.

Figure 5:
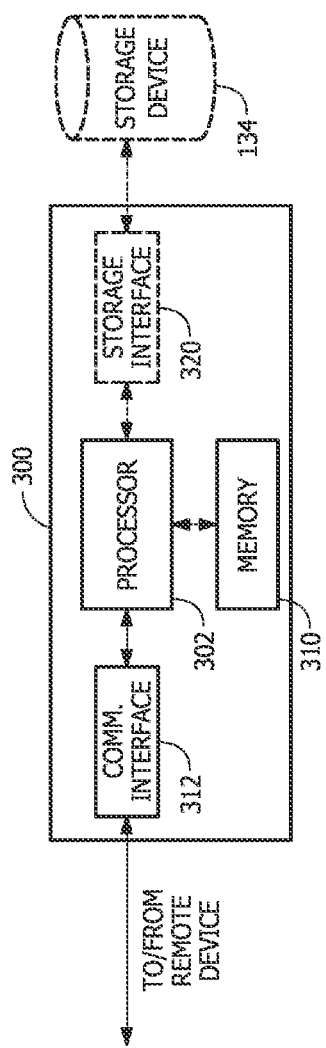
FIG. 5 illustrates an exemplary configuration of a server system shown in FIGS. 2 and 3.

FIG. 5 illustrates an exemplary configuration of a server computing device 300 such as server system 112 (shown in FIG. 2). Server computing device 300 may include, but is not limited to, database server 116, application server 124, web server 126, fax server 128, directory server 130, and mail server 132. Server computing device 300 also includes a processor 302 for executing instructions. Instructions may be stored in a memory area 310, for example. Processor 302 may include one or more processing units (e.g., in a multi-core configuration).

Processor 302 is operatively coupled to a communication interface 312 such that server computing device 300 is capable of communicating with a remote device such as user computing device 202 (shown in FIG. 4) or another server computing device 300. For example, communication interface 312 may receive requests from user computing device 202 via the Internet, as illustrated in FIG. 3.

Processor 302 may also be operatively coupled to a storage device 134. Storage device 134 is any computer-operated hardware suitable for storing and/or retrieving data. In some embodiments, storage device 134 is integrated in server computing device 300. For example, server computing device 300 may include one or more hard disk drives as storage device 134. In other embodiments, storage device 134 is external to server computing device 300 and may be accessed by a plurality of server computing devices 300. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 302 is operatively coupled to storage device 134 via a storage interface 320. Storage interface 320 is any component capable of providing processor 302 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 302 with access to storage device 134.

Figure 6:
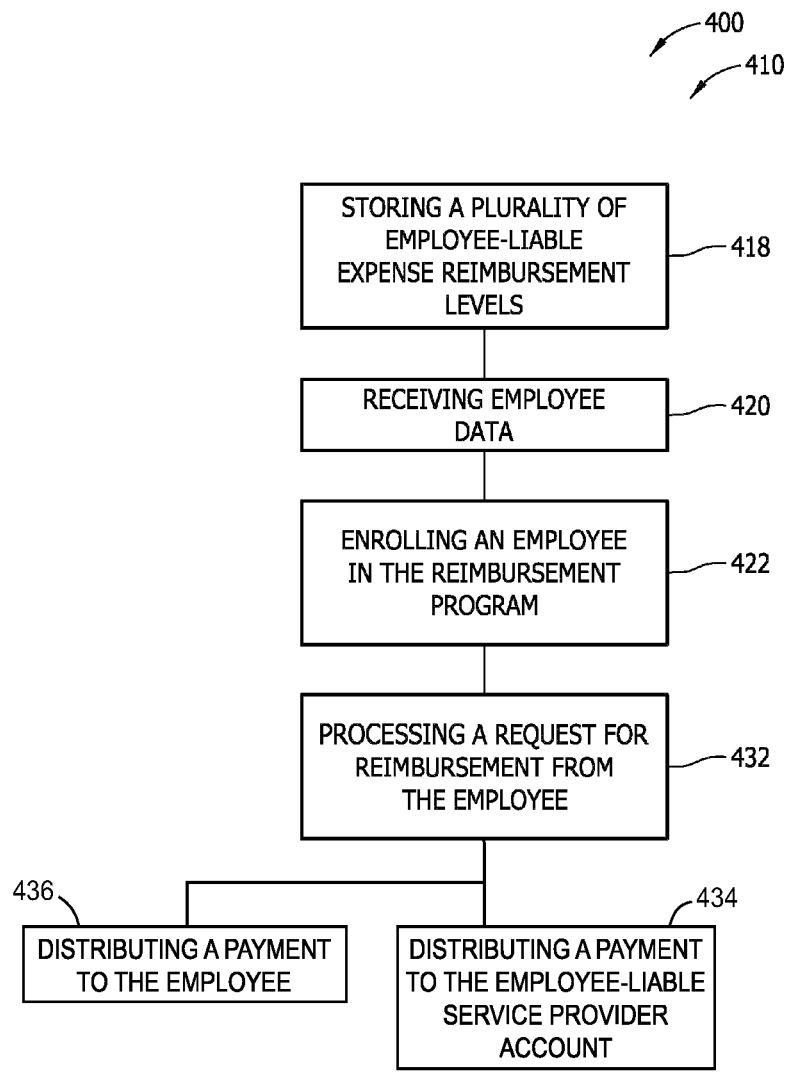
FIG. 6 is a flow chart of an exemplary method for managing payments made by an employer to accounts with a service provider for which an employee is liable, or optionally to an employee directly, using the expense management system shown in FIGS. 2 and 3.

FIG. 6 is a flow chart 400 of an exemplary method 410 for managing payments made by an employer, for example, employer 20 (shown in FIG. 1), to accounts with a service provider for which an employee is liable, for example, first service provider 30 (shown in FIG. 1). In the exemplary embodiment, an expense management system, for example, system 100 (shown in FIG. 2) and/or system 122 (shown in FIG. 3), is configured to perform method 410. In the exemplary embodiment, method 410 includes storing 418 a plurality of employee-liable expense reimbursement levels for use within an employee-liable reimbursement program. In the exemplary embodiment, the employee-liable expense reimbursement levels are predefined and stored within a memory device, for example, storage device 134 (shown in FIG. 3). As described above, the employee-liable reimbursement program facilitates distribution of electronic payments from employer 20 to an employee-liable service provider account. In the exemplary embodiment, the reimbursement levels are based at least partially on policies developed by employer 20. Furthermore, in the exemplary embodiment, an expense management system, for example, expense management system 16 (shown in FIG. 1), manages the employee-liable reimbursement program.

In the exemplary embodiment, method 410 also includes receiving 420 employee data from at least one of employer 20 and an employee of employer 20, for example, employee 42 (shown in FIG. 1). In the exemplary embodiment, method 410 also includes enrolling 422 employee 42 in the reimbursement program. In the exemplary embodiment, enrolling 422 includes determining 426 if employee 42 is eligible to register in the reimbursement program (see FIG. 8), determining 428 if a device associated with employee 42 is eligible for reimbursement (see FIG. 9), and determining 430 a level of payment to be made to a service provider account associated with employee 42 (see FIG. 10). In the exemplary embodiment, method 410 also includes processing 432 a request for reimbursement from employee 42 and distributing 434 a payment to the employee-liable service provider account, or, if the option for direct payment to employee 42 has been selected, distributing 436 a payment to the employee.

Figure 7:
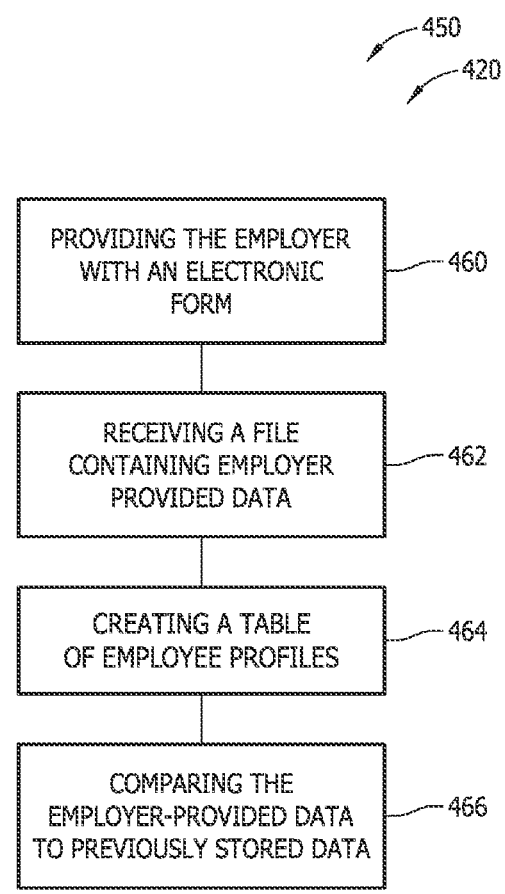
FIG. 7 is a flow chart of an exemplary method of receiving data from an employer implemented using the expense management system shown in FIGS. 2 and 3.

FIG. 7 is a flow chart 450 of an exemplary method of receiving 420 employee data from employer 20 (shown in FIG. 1). The data received 420 from employer 20 is also referred to herein as a human resources (HR) feed since typically, a human resources (HR) department of employer 20 has access to employee information and provides the employee information to expense management system 16. For example, the HR feed may be provided by a human resource information system (HRIS) and/or by using a lightweight directory access protocol (LDAP), and/or in any other suitable manner that allows expense management system 16 to function as described herein. In the exemplary embodiment, expense management system 16 provides 460 employer 20 with an electronic form that requests the employer-provided data required to implement the employee-liable reimbursement program. The HR feed includes data from which expense management system 16 creates an HR profile table. The HR profile table includes a record for each employee identified by employer 20 as being eligible to participate in the reimbursement program. The record includes at least an employee identifier, for example, but not limited to, an electronic mail (e-mail) address and/or an employee identification number.

In the exemplary embodiment, expense management system 16 receives 462 a file containing the employer-provided data (e.g., the HR feed). The employer-provided data includes, but is not limited to, employee identifiers (e.g., employee identification numbers) and/or employee e-mail addresses. The employer-provided data may also include a manager/approver identifier and contact data (e.g., e-mail address) for the manager/approver. Each employee eligible to participate in the reimbursement program is assigned a manager/approver tasked with reviewing requests for reimbursement submitted by the employee. Expense management system 16 uses the contact data to request approval of a request for reimbursement from the employee. Moreover, the HR feed may also include a cost center and/or a geographic location associated with the employee. This data allows expense management system 16 to provide records to employer 20 that are organized and/or sorted by cost center and/or geographic location.

In the exemplary embodiment, expense management system 16 creates 464 a table of employee profiles from the employer-provided data. This table is referred to herein as an HR profile table. In order to prevent creation of duplicate entries within the HR profile table, expense management system 16 compares 466 the employer-provided data to previously stored data. If the employer-provided data includes data associated with an employee whose employee identifier is already included within the HR profile table, expense management system 16 updates the employee's record within the HR profile table. The update may include an update to the employee's employment status, job description, and/or any other type of employee data that is used to determine eligibility in the reimbursement program. If an employee identifier associated with an employee not included in the HR profile table is included in the employer-provided data, expense management system 16 creates 464 a record for that employee within the HR profile table.

Figure 8:
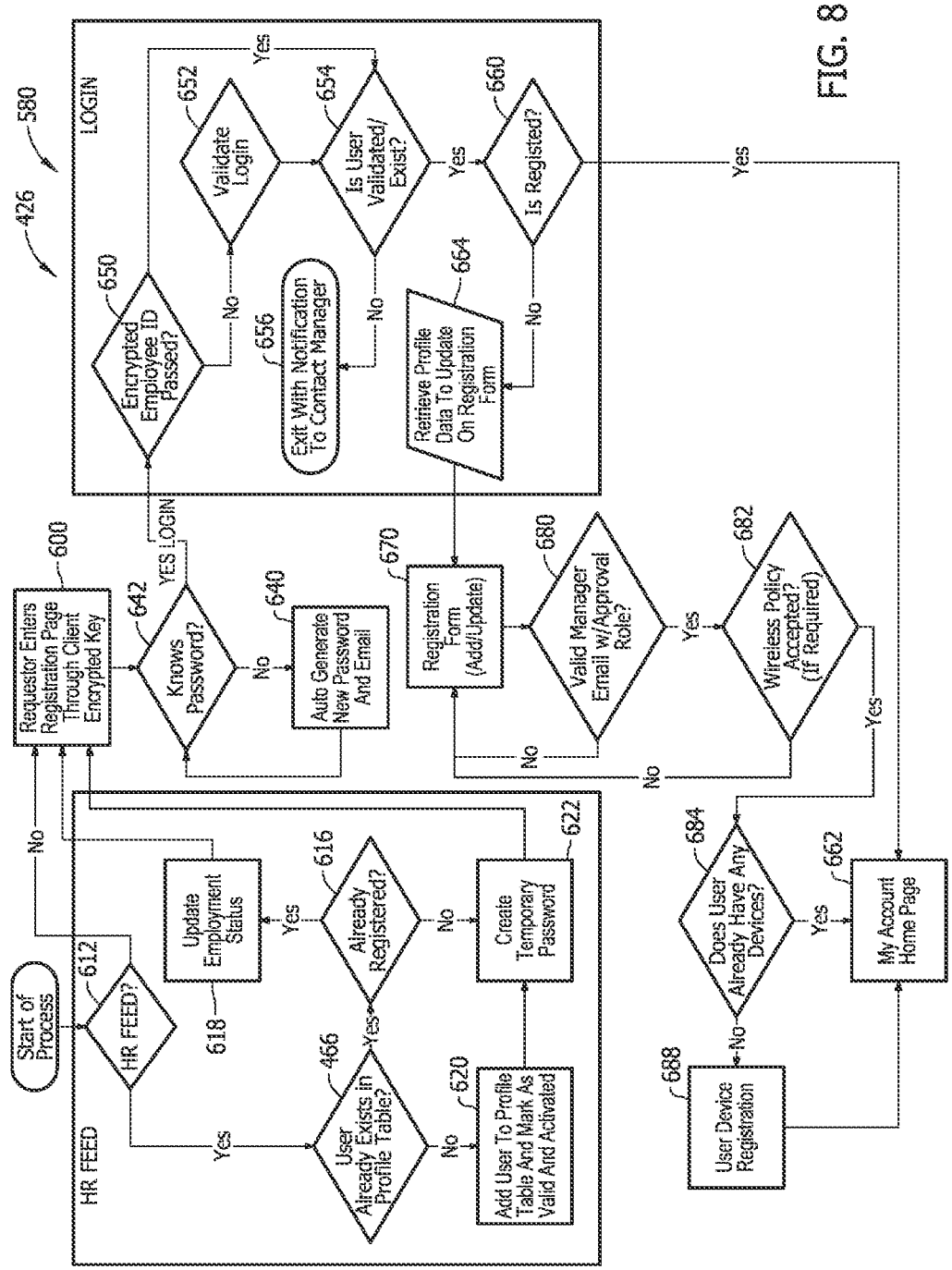
FIG. 8 is a flow chart of an exemplary method for registering an employee in the reimbursement program implemented using the expense management system shown in FIGS. 2 and 3.

FIG. 8 is a flow chart 580 of an exemplary method for determining 426 if an employee, for example, employee 42 (shown in FIG. 1), is eligible to register in the reimbursement program. As described above, enrolling 422 (shown in FIG. 6) employee 42 in the reimbursement program includes determining 426 if employee 42 qualifies for registration in the reimbursement program. In the exemplary embodiment, expense management system 16 determines 426 that employee 42 qualifies for registration in the reimbursement program when employee 42 completes an employee registration process. The registration process includes activating an employee account within expense management system 16 (shown in FIG. 1). An employee is enrolled in the reimbursement program once an employee account is activated within expense management system 16.

In the exemplary embodiment, employee 42 accesses 600 a registration webpage using a client encrypted key and an employee identifier/password combination. For example, employer 20 and/or expense manager 14 may provide employee 42 with an electronic invitation to join the reimbursement program. The electronic invitation includes the client encrypted key and a link to the registration webpage.

The client encrypted key identifies to expense management system 16 that employee 42 is an employee of employer 20. In the exemplary embodiment, the HR profile table stored by expense management system 16 includes a previously created record for employee 42. More specifically, expense management system 16 has created 464 (shown in FIG. 7) a record for employee 42 within the HR profile table from data provided by employer 20 in the HR feed provided to expense management system 16. Including data associated with employee 42 within the HR feed allows expense management system 16 to automatically approve a registration request submitted by employee 42. In an alternative embodiment, employer 20 has not provided data associated with employee 42 within the HR feed, and therefore, expense management system 16 has not created a record for employee 42 within the HR profile table. If a record of employee 42 is not included in the HR profile table, expense management system 16 must obtain approval from employer 20 of the request for registration submitted by employee 42.

More specifically, in the exemplary embodiment expense management system 16 determines 612 if an HR feed has been received from employer 20. If an HR feed has been received, expense management system 16 compares 466 the employee identifiers included within the HR feed with employee identifiers that already exist in the HR profile table previously created by expense management system 16 from data included in a previously received HR feed. If an employee record already exists in the HR profile table, expense management system 16 determines 616 if the employee associated with the employee record has previously registered in the reimbursement program. If the employee has already registered, expense management system 16 updates 618 the employment status of the employee from data included within the most recent HR feed. Updating the employment status ensures that reimbursement payments are only provided for employees with a proper employment status (e.g., no payments made for terminated employees). Updating the records within the HR profile table periodically with data provided by the human resources department of employer 20 provides an automatic cross-check of at least one expense of employer 20 with current human resource data. The human resource department and financial departments of an employer typically are separate, with no convenient means to electronically exchange data or match expenses associated with an employee to a current employment status of the employee.

If there is employee data in the HR feed associated with employees not included in the HR profile table previously created by expense management system 16, expense management system 16 creates 620 records corresponding to the additional employee data within the HR profile table and marks the records as valid. Once expense management system 16 creates 620 records corresponding to the additional employee data, expense management system 16 also creates 622 a temporary password and provides the temporary password to the employees associated with the additional employee data, for example, via e-mail. Furthermore, if data included in the HR feed is associated with employees already included within the HR profile table, but who have not previously registered in the reimbursement program, expense management system 16 also creates 622 a temporary password and provides the temporary password to the unregistered employees.

As described above, employee 42 accesses 600 a registration webpage using a client encrypted key provided by at least one of employer 20 and expense manager 14, and an employee identifier/password combination. The registration webpage facilitates registering employee 42 in the reimbursement program, and if previously registered, allows employee 42 to access an account webpage customized for employee 42 (i.e., a "My Account Page"). If employee 42 indicates (e.g., by selecting a "forgot password" selection provided on the registration webpage) that they do not know their password, expense management system 16 generates 640 a new password and provides the new password to employee 42, for example, via e-mail. If employee 42 knows their password, employee 42 enters 642 their employee identifier/password combination in order to login to expense management system 16.

In the exemplary embodiment, expense management system 16 determines 650 if the login information provided is encrypted and, if not, validates 652 the login information. If the login information provided is encrypted, or if the login information provided is validated, expense management system 16 determines 654 if employee 42 has previously validated the data from the HR feed. Expense management system 16 displays the data from the HR feed associated with employee 42 to employee 42 and asks employee 42 to confirm that the data is accurate (e.g., cost center and/or manager is correct, name is spelled correctly, etc.). If employee 42 indicates that the data is not accurate, expense management system 16 transmits 656 a notification to employee 42 instructing employee 42 to contact a manager to address the incorrect information. If employee 42 indicates that the data is accurate, expense management system 16 marks the employee record in the HR profile table associated with employee 42 as validated.

If the employee record associated with employee 42 has been marked as validated, expense management system 16 determines 660 if employee 42 has previously registered in the reimbursement program. If employee 42 is already registered in the reimbursement program, expense management system 16 provides 662 employee 42 with access to an account webpage customized for employee 42 (i.e., a "My Account Page").

If employee 42 is validated, but has not previously registered in the reimbursement program, expense management system 16 retrieves 664 profile data provided by employer 20 and included within the HR feed and pre-populates a registration form with the retrieved profile data. Employee 42 provides expense management system 16 with employee data by completing the registration form. Expense management system 16 provides 670 employee 42 with the electronic registration form with some fields pre-populated to include data received from employer 20. Employee data may include, but is not limited to, employee name, employee identifier, geographic location of the employee, and/or a manager identifier (e.g., e-mail address) associated with a manager to which the employee reports.

In the exemplary embodiment, employee 42 transmits the electronic registration form to expense management system 16 after populating the fields contained therein. In the exemplary embodiment, expense management system 16 determines if all required information has been provided by employee 42. For example, expense management system 16 may determine 680 if a valid manager identifier has been provided by employee 42 and whether the manager associated with the manager identifier has been identified by employer 20 as having approval authority. If a manager identifier associated with someone having approval authority has not been provided to expense management system 16, expense management system 16 provides 670 the electronic registration form to employee 42 with instructions to provide a valid manager identifier. Furthermore, if a manager identifier associated with someone having approval authority has been provided, expense management system 16 may determine 682 if employee 42 has indicated approval of a wireless policy created by employer 20 and/or expense manager 14.

Once employee 42 has provided all required information, expense management system 16 determines 684 if any devices have been associated with employee 42. For example, expense management system 16 may determine 684 if employee 42 has previously registered any devices in the reimbursement program. If employee 42 has not previously registered any devices, employee 42 is provided 688 with a device registration webpage, through which employee 42 is able to register a device. If employee 42 has previously registered a device, employee 42 is provided 662 with access to the My Account Page.

Figure 9:
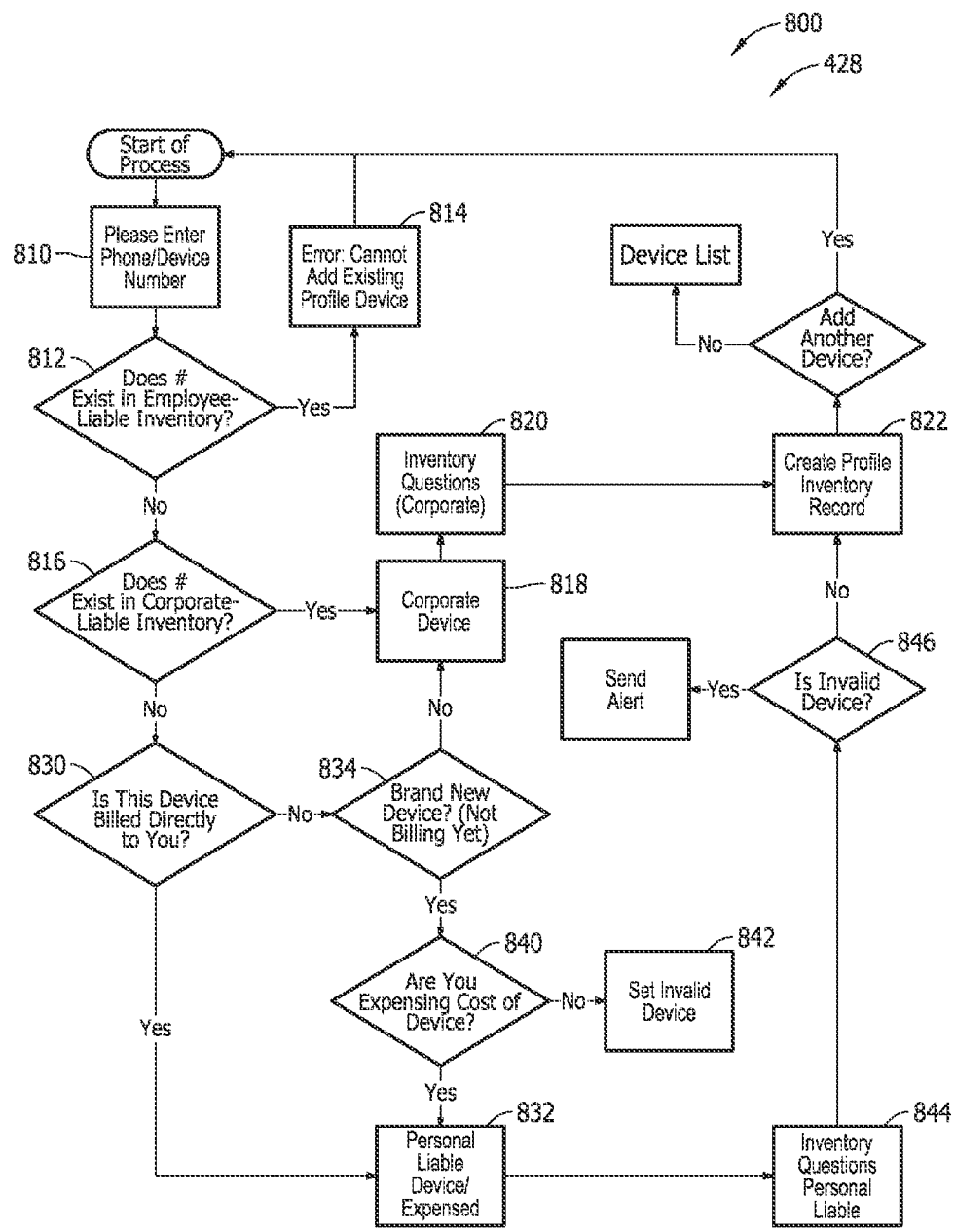
FIG. 9 is a flow chart of an exemplary method for registering a device in the reimbursement program implemented using the expense management system shown in FIGS. 2 and 3.

FIG. 9 is a flow chart 800 of an exemplary method for determining 428 if a device is eligible for reimbursement through the employee-liable device reimbursement program. Once the request for registration from employee 42 is approved 590 (see FIG. 8), expense management system 16 determines 428 if costs incurred by employee 42 associated with a device used by employee 42 are eligible for reimbursement through the reimbursement program. In the exemplary embodiment, expense management system 16 determines 428 that the device qualifies for reimbursement through the reimbursement program based on answers provided by employee 42 during a device registration process. The device registration process includes obtaining device data from employee 42. The device data includes, but is not limited to, data used to identify the device and data used to determine if costs associated with the device are employee-liable expenses or employer-liable expenses. Furthermore, the device registration process facilitates creating a device list for use by employer 20 in tracking employee-liable devices and/or employer-liable devices.

In the exemplary embodiment, expense management system 16 requests 810 that employee 42 provide an identifier associated with a device used by employee 42. For example, employee 42 may provide a mobile phone number associated with a mobile phone used by employee 42. Employee 42 may also provide other types of identification numbers including, but not limited to, a mobile identification number (MIN), an electronic serial number (ESN), an international mobile equipment identity (IMEI) number, a mobile equipment identifier (MEID), and/or any other unique identifier assigned to one specific device.

In the exemplary embodiment, expense management system 16 determines 812 if a device associated with the provided identifier exists in a stored employee-liable device inventory. For example, expense management system 16 may already be storing device information associated with employee-liable devices for employer 20. This device information is stored in the employee-liable device inventory. If expense management system 16 determines 812 that a device associated with the provided identifier exists in the stored employee-liable device inventory, expense management system 16 provides 814 an error message to employee 42 indicating that the device may not be registered because the device has already been registered.

In the exemplary embodiment, if expense management system 16 determines 812 that a device associated with the provided identifier does not exist in the stored employee-liable device inventory, expense management system 16 determines 816 if a device associated with the provided identifier exists in an employer-liable device inventory. For example, expense management system 16 may also store information related to employer-liable devices of employer 20. Employer-liable devices are devices that employer 20 owns and is liable for associated costs. If expense management system 16 determines 816 the device associated with the provided identifier is in the employer-liable device inventory, expense management system 16 designates 818 the device as an employer-liable device. Employer-liable devices are not eligible to be registered in the employee-liable device reimbursement program since costs associated with employer-liable device are paid by employer 20 using a different process. In the exemplary embodiment, expense management system 16 requests 820 employee 42 provide answers to employer-liable device inventory questions so that expense management system 16 may create 822 a profile inventory record for the device. The profile inventory may include records for both employee-liable devices and employer-liable devices. Although employer-liable devices are not eligible for the reimbursement program, expense management system 16 creates 822 profile inventory records for the employer-liable devices in order to provide employer 20 with a combined directory of employer-liable and employee-liable devices. The employer-liable device information requested by expense management system 16 may include, but is not limited to, a device type, a device description, and/or a device tracking number.

If expense management system 16 determines 816 that a device associated with the provided identifier does not exist in the employer-liable inventory, expense management system 16 requests 830 billing information from employee 42. For example, expense management system 16 may ask if the device is billed directly to employee 42. If the device is billed directly to employee 42, expense management system 16 designates 832 the device as an employee-liable/expensed device. An employee is personally liable for costs associated with an employee-liable device.

Furthermore, if the device is not billed directly to employee 42, expense management system 16 determines 834 if the reason employee 42 has not yet received an invoice for the device from a service provider, for example, service provider 30 (shown in FIG. 1) is that the device is new. If employee 42 indicates to expense management system 16 that the device is not new, expense management system 16 designates 818 the device as an employer-liable device since invoices for the device are most likely being issued to employer 20. If employee 42 indicates that the device is new, expense management system 16 requests 840 expensing information from employee 42. If employee 42 indicates that costs associated with the device will be expensed, expense management system 16 also designates 832 the device as an employee-liable/expensed device. If employee 42 indicates that costs associated with the device will not be expensed, system 16 designates 842 the device as an invalid device. The device is designated 842 as an invalid device because information provided by employer 20 during the device registration is either contradictory or does not provide enough information for expense management system 16 to determine if the device is an employee-liable device or an employer-liable device. Additional information, and typically interaction between employer 20 and employee 42, is necessary to resolve registration issues for a device designated 842 as invalid.

In the exemplary embodiment, once expense management system 16 designates 832 the device as an employee-liable/ expensed device, expense management system 16 requests 844 employee 42 provide answers to employee-liable inventory questions so that expense management system 16 may create 822 a profile inventory record for the device. The employee-liable inventory information requested by expense management system 16 may include, but is not limited to, a device type, a device description, a device carrier (e.g., a service provider associated with the device), a device model, a device make, and/or a device master account number. In the exemplary embodiment, expense management system 16 determines 846 if the device is an invalid device. For example, expense management system 16 analyzes the employee-liable inventory information provided by employee 42 to identify contradictory information and/or missing information that would require human interaction to resolve. The method of determining 428 if a device is eligible may be repeated, as employee 42 may seek to register more than one device in the employee-liable expense reimbursement program. For example, employee 42 may be liable for expenses related to a mobile phone, expenses related to a tablet computing device (e.g., an iPad®, iPad® is a registered trademark of Apple, Inc.), and expenses related to a home computer (e.g., Internet access). Expense management system 16 allows employee 42 to register multiple devices in the reimbursement program.

Figure 10:
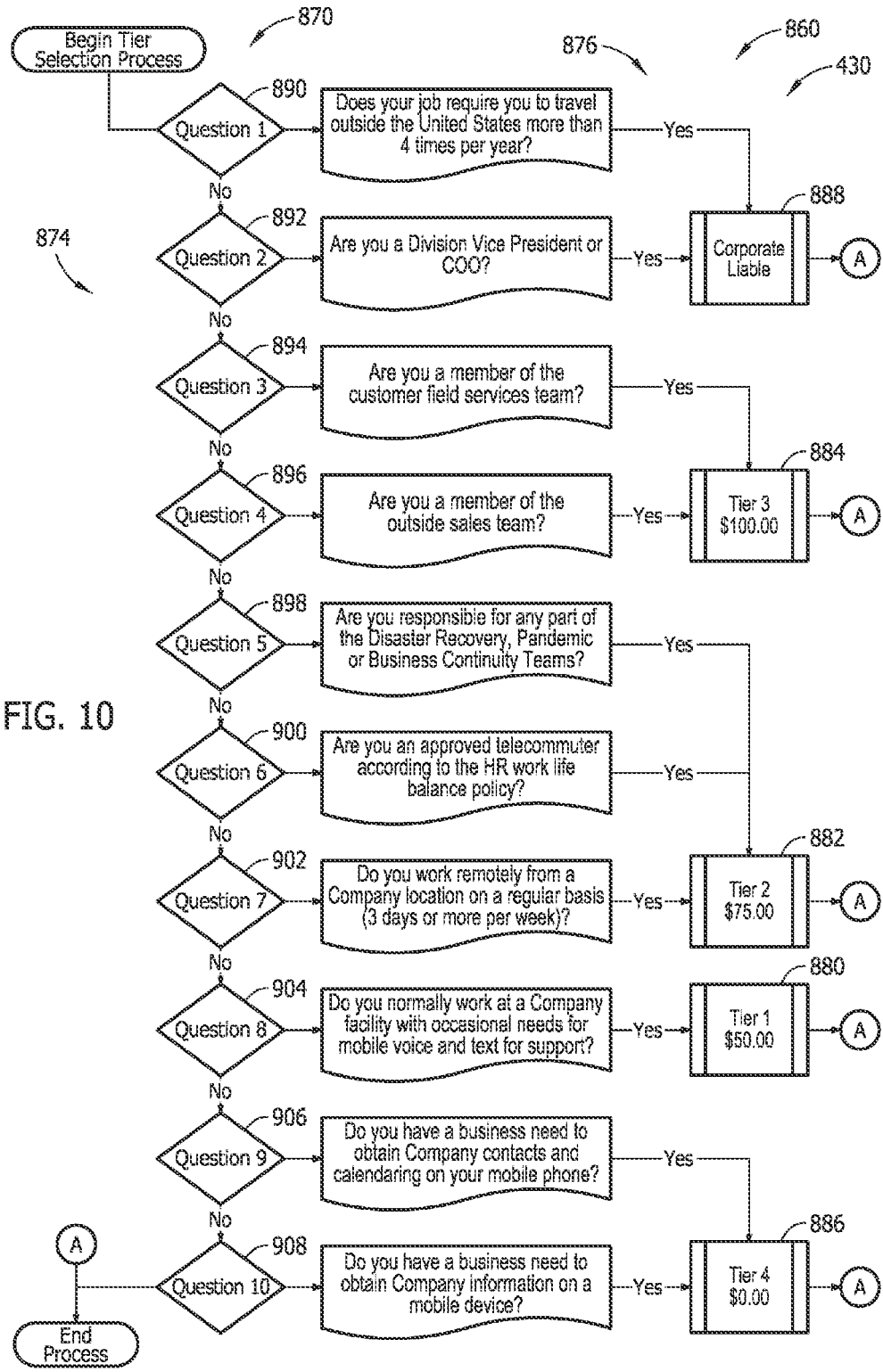
FIG. 10 is a flow chart of an exemplary method for determining which employee-liable expense reimbursement level an employee is eligible to receive using the expense management system shown in FIGS. 2 and 3.

FIG. 10 is a flow chart 860 of an exemplary method for determining 430 which employee-liable expense reimbursement level an employee, for example, employee 42 (shown in FIG. 1), is eligible to have reimbursed. As described above, enrolling 422 (shown in FIG. 6) employee 42 in the reimbursement program includes determining 430 a level of payment to be made to a service provider account associated with employee 42, or, if a direct employment payment option has been selected, to be made directly to employee 42. In the exemplary embodiment, the employee-liable expense reimbursement level that an employee is eligible to have reimbursed is determined by expense management system 16 based on the employee's responses to a plurality of questions. In an alternative embodiment, the employee-liable expense reimbursement level that an employee is eligible to have reimbursed is provided to expense management system 16 by employer 20, for example, within the HR feed. In another alternative embodiment, the employee-liable expense reimbursement level that an employee is eligible to have reimbursed is determined based on a position the employee holds with employer 20, and a reimbursement level provided by employer 20 associated with that position. For example, employer 20 may provide expense management system 16 with a list of job titles and the reimbursement level associated with each of those job titles. Expense management system 16 determines 430 which employee-liable expense reimbursement level an employee is eligible to have reimbursed based on the employee's job title.

In the exemplary embodiment, determining 430 which employee-liable expense reimbursement level employee 42 is eligible to receive includes requesting information from at least one of employee 42 and employer 20 regarding the job employee 42 performs for employer 20, usage of the device by employee 42, and/or any other information that allows expense management system 16 to execute the employee-liable reimbursement program policies developed by employer 20.

For example, expense management system 16 may provide 870 a plurality of questions 874 to at least one of employee 42 and employer 20. Expense management system 16 determines 876 from the responses to these questions whether employee 42 is eligible to have a reimbursement payment made to a service provider on their behalf, or, if a direct employee payment option has been selected, directly to employee 42, at a first level 880, a second level 882, a third level 884, or a fourth level 886. Although described as including four levels, the reimbursement program may reimburse at any number of different levels. Furthermore, expense management system 16 may determine from the responses to questions 874 that a device of employee 42 that is possibly eligible for inclusion in the reimbursement program is an employer-liable device 888 based on the job of employee 42. In the illustrated example, if an answer to a first question 890 of plurality of questions 874 indicates to expense management system 16 that employee 42 is required to travel outside of the United States more than four times per year for business related purposes, or an answer to a second question 892 indicates to expense management system 16 that employee 42 is a division vice president or chief operating officer, then expense management system 16 determines 876 that a mobile phone used by employee 42 is treated as an employer-liable device 888.

Furthermore, in the exemplary embodiment, if employee 42 answers first question 890 and second question 892 in the negative, and if an answer to a third question 894 indicates to expense management system 16 that employee 42 is a member of the customer field services team, expense management system 16 determines 876 that employee 42 is eligible to have a reimbursement payment made on their behalf to a service provider, or directly to employee 42 (if that option was selected), at third level 884. If employee 42 answers questions 890, 892, and 894 in the negative, and if an answer to a fourth question 896 indicates to expense management system 16 that employee 42 is a member of the outside sales team, expense management system 16 determines 876 that employee 42 is eligible to have a reimbursement payment made on their behalf to a service provider, or directly to employee 42 (if that option was selected) at third level 884.

Moreover, if employee 42 answers questions 890, 892, 894, and 896 in the negative, and an answer to a fifth question 898 indicates to expense management system 16 that employee 42 is responsible for a disaster recovery team, pandemic team, or business continuity team, expense management system 16 determines 876 that employee 42 is eligible to have a reimbursement payment made on their behalf to a service provider, or directly to employee 42 (if that option was selected), at second level 882. Expense management system 16 may provide additional questions, for example, questions 900, 902, 904, 906, and 908 in order to determine 876 which level of reimbursement payment employee 42 is eligible to have made on their behalf, or made directly to them (if that option was selected).

Figure 11:
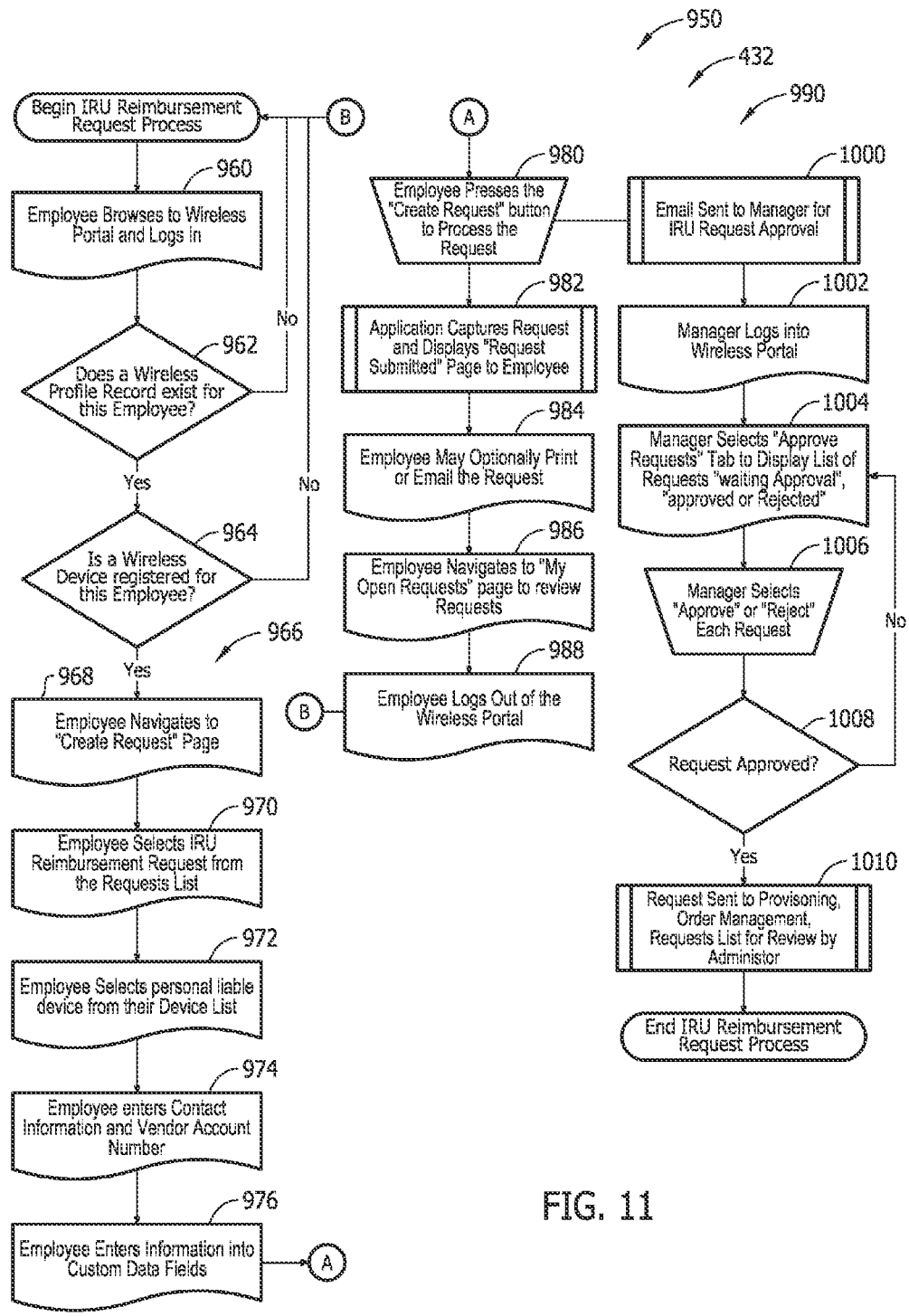
FIG. 11 is a flow chart of an exemplary method for receiving a request for reimbursement from an employee implemented using the expense management system shown in FIGS. 2 and 3.

FIG. 11 is a flow chart 950 of an exemplary method for processing 432 a request for reimbursement from an employee, for example, employee 42 (shown in FIG. 1). Prior to submitting a request for reimbursement, employee 42 has enrolled 422 (shown in FIG. 6) in the reimbursement program. In the exemplary embodiment, expense management system 16 provides 960 employee 42 with a log in webpage that allows employee 42 to enter a wireless device request for reimbursement portal. For example, expense management system 16 may provide employee 42 with a link to the request for reimbursement portal. That link may be accessed by employee 42 via the "My Account Page" described with respect to FIG. 8. Expense management system 16 determines 962 whether an employee account has been registered and activated for employee 42 (i.e., a wireless profile record exists for employee 42). If expense management system 16 determines 962 that a wireless profile record exists for employee 42, expense management system 16 determines 964 whether a wireless device is registered for employee 42. If a wireless profile record does not exist for employee 42, or no wireless device is registered for employee 42, employee 42 is returned to the log in webpage.

In the exemplary embodiment, if a wireless device is registered for employee 42, expense management system 16 receives 966 a reimbursement request from employee 42. For example, expense management system 16 may provide 968 employee 42 with a "create reimbursement request" webpage. Once employee 42 selects 970 a reimbursement request from a requests list provided by expense management system 16, employee 42 is able to enter information requested by expense management system 16. The information provided by employee 42 within the reimbursement request may include payment information associated with an employee-liable device. For example, expense management system 16 may receive 972 a device selection from employee 42, receive 974 payment information associated with the device selection, and/or receive 976 custom data provided by employee 42. More specifically, the payment information may include, but is not limited to, the name of the service provider associated with the device, contact information for the service provider associated with the device, an account identifier associated with an account with the service provider associated with employee 42 and/or the device, and/or any other information that may be used by expense management system 16 to electronically direct a payment to the account with the service provider associated with employee 42, or (if a direct employee payment option is selected) a payment directly to employee 42 or an account associated with employee 42.

Once the requested payment information is provided, expense management system 16 receives 980, from employee 42, a request to create the reimbursement request. Expense management system 16 captures 982 the request to create the reimbursement request and provides employee 42 with the option to print/e-mail 984 the request for reimbursement, review 986 open requests for reimbursement, and/or log out 988 of the request for reimbursement portal.

Furthermore, in the exemplary embodiment, expense management system 16 requests 990 approval of the request for reimbursement from employer 20. For example, once expense management system 16 receives 980 a request to create the reimbursement request, system 16 transmits 1000 a notification to employer 20 that a request for reimbursement is available for review. More specifically, in the exemplary embodiment, system 16 transmits 1000 the notification to a manager of employee 42. As described above, during registration, a manager identifier is provided of a person who has authority to approve requests for reimbursement submitted by employee 42 (see FIG. 8).

The manager logs in 1002 to expense management system 16, and more specifically, to a "manager approval" webpage. Through the "manager approval" webpage, the manager may access 1004 a list of requests for reimbursement awaiting review. Furthermore, the manager may provide 1006 an approval or denial for each of the requests for reimbursement in the list. Expense management system 16 determines 1008 if a request was approved or denied, and if a request is approved, the approved request for reimbursement is provided 1010 to an administrator of expense management system 16 for review. After receiving an approval or denial from the manager, expense management system 16 again provides the list of requests for reimbursement awaiting review to the manager so the manager can review the remaining requests.

Figure 12:
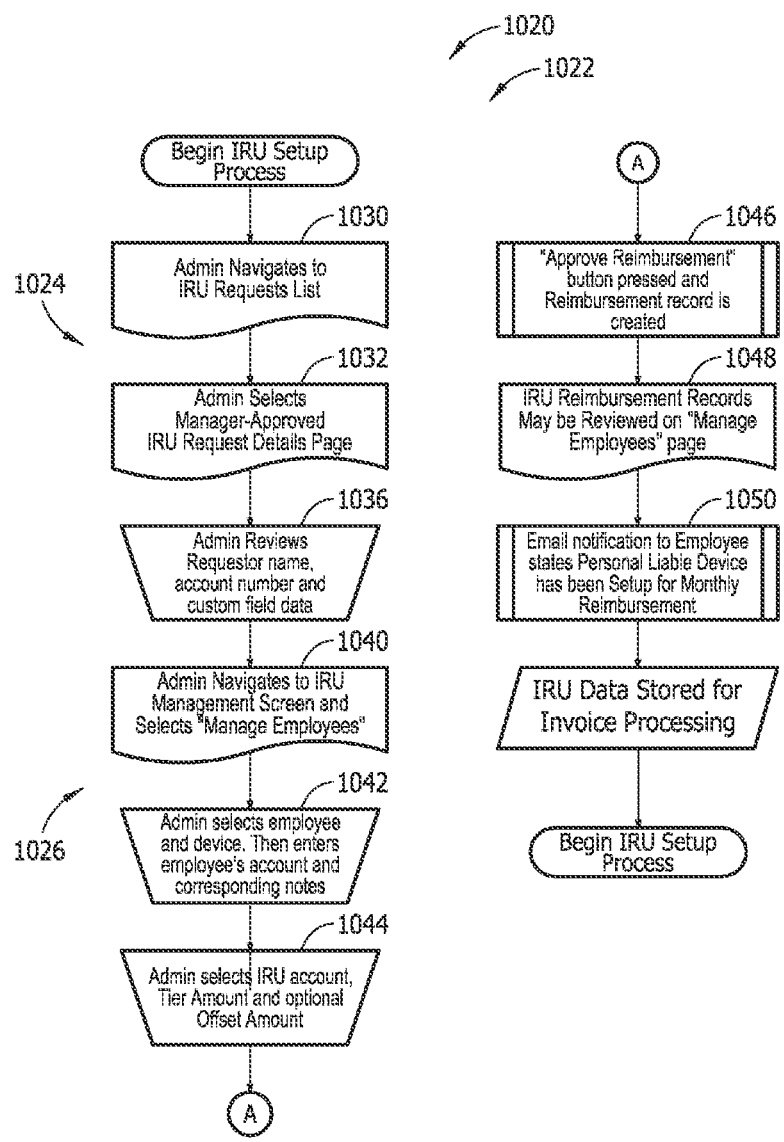
FIG. 12 is a flow chart of an exemplary method for approving a reimbursement request from an employee implemented using the expense management system shown in FIGS. 2 and 3.

FIG. 12 is a flow chart 1020 of an exemplary method for initiating 1022 recurring reimbursement program payments. As described above, requests for reimbursement are provided 1010 to an administrator of expense management system 16 for review once the request for reimbursement is approved by employer 20. In the exemplary embodiment, initiating 1022 recurring reimbursement program payments includes reviewing 1024 approved requests for reimbursement and creating 1026 a reimbursement record associated with an employee. For example, an administrator of expense management system 16 may review 1024 an approved request for reimbursement submitted by employee 42 and create 1026 a reimbursement record within the employee record associated with employee 42. In the exemplary embodiment, the reimbursement record includes the information needed to make payments to a service provider account associated with employee 42, for example, but not limited to, an amount and frequency of payment, a service provider master account identifier, and/or a service provider account identifier. In the exemplary embodiment, the service provider master account identifier corresponds to a service provider, for example, service provider 30 (shown in FIG. 1). Furthermore, in the exemplary embodiment, the service provider account identifier corresponds to an individual employee's account with service provider 30. In other words, each service provider account is a sub-account of a service provider master account. In order to enable an option for direct employee payment to be exercised, the reimbursement record will also contain employee account information if payments are to be made electronically to employee 42 or address and other information that may be necessary if payments are to be made to employee 42 by check.

In the exemplary embodiment, expense management system 16 will request approval of payments, and make payments to service providers, associated with employees who have a reimbursement record included within their employee records, or make payments directly to employees who have a reimbursement record included within their employee records, and with respect to whom the direct employee payment option has been exercised. More specifically, once a reimbursement record associated with employee 42 is created, expense management system 16 will submit an invoice to employer 20 on a periodic basis that includes the payment requested by employee 42 in the approved request for reimbursement. For example, expense management system 16 may submit an invoice to employer 20 once every month requesting approval of the payment requested by employee 42.

To facilitate reviewing 1024 approved requests for reimbursement, expense management system 16 may provide 1010 the administrator with an "administrator review" webpage. For example, the administrator may access 1030 a list of reimbursement requests through the "administrator review" webpage. Furthermore, the administrator may access 1032 the approved reimbursement requests through the "administrator review" webpage. In the exemplary embodiment, reviewing 1024 includes reviewing 1036 the employee identifier, device identifier, name of the service provider, service provider account identifier, and/or other information included within the request for reimbursement.

In the exemplary embodiment, to create 1026 a reimbursement record, the administrator is provided 1040 with access to a "manage employees" webpage. For example, to create 1026 the reimbursement record, the administrator adds the reimbursement record to the employee record associated with employee 42. More specifically, to create 1026 the reimbursement record, the administrator selects 1042 employee 42 and a device associated with employee 42 that has been registered in the reimbursement program and adds the device identifier associated with the device and/or the service provider account identifier associated with the device, to the reimbursement record. The administrator also selects 1044 a reimbursement level that employee 42 is eligible to have reimbursed. This level may be determined 430 as described above with respect to FIG. 10. The administrator also selects 1044 a service provider master account identifier corresponding to the service provider employee 42 named as the service provider associated with the device. For example, employee 42 may indicate in the request for reimbursement that they have an employee-liable service provider account with Service Provider A. The administrator selects 1044 the service provider master account identifier predefined as corresponding to Service Provider A within expense management system 16 and it is included within the reimbursement record. Typically, in an invoice generated by a service provider, the service provider provides a service provider identifier used for recordkeeping and to aid in submission of payments to the service provider. However, as is described further below, expense management system 16 does not have access to the invoices associated with employee-liable devices. To facilitate generating invoices, and associated records, expense management 16 assigns a predefined master account identifier to each service provider included in reimbursement requests from employees of employer 20. Although described above as a manual data entry process performed by the administrator, creating 1026 the reimbursement record may be performed automatically by expense management system 16. Alternatively, if the option has been selected for employee 42 to be reimbursed directly, the administrator selects 1044 an employee account identifier associated with an employee account which employee 42 has designated for receipt of reimbursement payments.

Once the administrator enters the information necessary to create the reimbursement record within the employee record, the administrator selects 1046 an "approve reimbursement" option and the reimbursement record is created. The reimbursement records may be reviewed 1048 and/or a notification may be transmitted 1050 to employee 42 indicating that the reimbursement record has been created.

Figure 13:
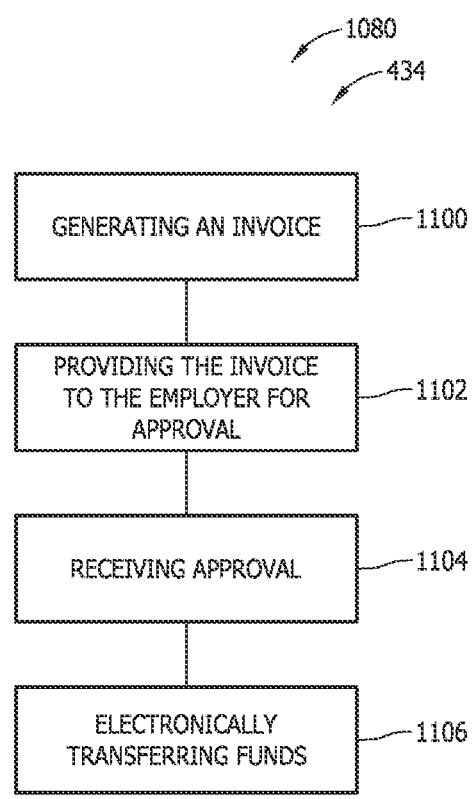
FIG. 13 is a flow chart of an exemplary method for distributing payments to employee-liable service provider accounts using the expense management system shown in FIGS. 2 and 3.

FIG. 13 is a flow chart 1080 of an exemplary method for distributing 434 (see FIG. 6) payments to employee-liable service provider accounts or employee accounts, in the case of direct employee reimbursement. As described above, employee 42 is liable for expenses related to services provided to employee 42 by service provider 30. Employee 42 has registered with service provider 30 and has been assigned a service provider account, identified by a first service provider account identifier, to track payments made to the service provider and amounts owed to the service provider for services rendered. Similarly, second employee 44 has registered with service provider 32 and has been assigned a service provider account, identified by a second service provider account identifier. Furthermore, third employee 46 has registered with service provider 34 and has been assigned a service provider account, identified by a third service provider account identifier. Moreover, as described above, typically a first plurality of employees will be party to contracts with service provider 30, a second plurality of employees will be party to contracts with service provider 32, and a third plurality of employees will be party to contracts with service provider 34. Each of the employees included within first, second, and third plurality of employees will be assigned a service provider account and associated service provider account identifier. These service provider account identifiers allow expense management system 16 to apply reimbursement amounts to the intended account with each service provider. Alternatively, each of the employees for whom a direct payment option applies, will provide an employee account and an employee account identifier. These employee account identifiers will likewise enable expense management system 16 to apply reimbursement amounts with the intended employee account associated with each employee.

In the exemplary embodiment, distributing 434 payments to employee-liable service provider accounts includes generating 1100 an invoice. Since the expenses reimbursed using expense management system 16 are employee-liable expenses, invoices detailing amounts owed to the service provider for services rendered are provided to the employee that is liable for the expenses. For example, service provider 30 will not send an invoice to expense manager 14 or employer 20 that details amounts owed by employee 42, since, it is employee 42 who is liable for the amount owed to service provider 30. Therefore, in order for expense manager 14 to obtain approval of payments made associated with the employee-liable reimbursement program, and for employer 20 to have detailed records of payments made associated with the program, expense management system 16 generates 1100 an invoice. Typically, an invoice is generated by the party who is owed a payment, however, to facilitate payments to the service providers, without having access to the invoices issued by the service providers, expense management system 16 generates 1100 invoices of amounts and payments that will be made as part of the program, rather than amounts actually owed to the service providers.

In the exemplary embodiment, expense management system 16 generates 1100 the invoice based on the reimbursement records included within the employee records (see FIG. 12 for creation of the reimbursement records). As described above, once a manager approves a reimbursement request from an employee, an administrator creates a reimbursement record within the employee's record. Expense management system 16 accesses the reimbursement records and generates 1100 the invoice. The invoice may be a single invoice that includes all payments scheduled for payment within a predefined time period, for example, the upcoming month, associated with approved reimbursement requests.

In the exemplary embodiment, the invoice is provided 1102 to employer 20 in an electronic format, for example, expense management system 16 may provide 1102 employer 20 with access to a webpage. The webpage may provide 1102 employer 20 with options on how to organize the data included within the invoice. For example, employer 20 may be able to organize the invoice to view expenses associated with a specific service provider master account identifier or employee account identifier. More specifically, employer 20 may be able to view and approve a total amount that expense management system 16 is to pay to all the service providers or employees over the predefined time period or employer 20 may be able to view and approve individual amounts that expense management system 16 is to pay to first service provider 30, second service provider 32, and/or third service provider 34, and/or to employee 42, employee 44, and/or employee 46. Although described as a single invoice, the customization of the invoice provided by expense management system 16 allows employer 20 to request and receive multiple invoices that include a more detailed description of the amounts to be paid by expense management system 16 and to analyze the reimbursement program data in a number of ways. Employer 20 may also be able to organize the invoice to view expenses associated with each individual employee having a service provider account or employee account that is scheduled to receive funds within the predefined time period pending approval by employer 20.

Furthermore, expense management system 16 may provide other data associated with the reimbursement program to employer 20. For example, expense management system 16 may provide data to employer 20 that identifies a portion of the payment amount included in the invoice that is associated with a specific cost center within employer 20. Expense management system 16 may also provide data to employer 20 that identifies a portion of the payment amount that is associated with a specific geographic location of the employees. The data provided by expense management system 16 may include any other types of data that facilitate analysis of spending by employer 20 associated with the reimbursement program.

The data associated with the reimbursement program that is provided to employer 20 may be provided in the form of a report. In the exemplary embodiment, expense management system 16 stores data associated with the reimbursement program and accesses the data to generate historical reports. Types of reports may include, but are not limited to: a report detailing payment information and payment history for an individual enrolled in the reimbursement program; a report detailing payments made to a single service provider over a selectable time period; an IRU inventory report detailing all IRU devices, the employee associated with each of the IRU devices, the geographical location of the employee, the cost center associated with the employee, the service provider providing service to the employee, and a phone number associated with each of the IRU devices; and a report detailing corporate spending by service provider and/or personal spending by service provider. These reports may be customized by employer 20 and/or employee 42, for example, to show a historical spending trend over a selectable time period.

Moreover, in the exemplary embodiment, expense management system 16 provides 1102 the invoice and/or other data to employer 20 in a predefined format that is compatible with record-keeping software utilized by employer 20. For example, the format may allow software of employer 20 to import records included within the invoice to a general ledger of employer 20. Furthermore, the format may be the same format used to process invoices received that are associated with employer-liable devices. For example, employer 20 may receive an invoice, in a first format, from service provider 30 that includes amounts owed for use of employer-liable devices. In another example, employer 20 may receive invoices, in a first format, from expense management system 16 for amounts owed for use of employer-liable devices (i.e., expense management system 16 may also manage payments to service providers associated with employer-liable devices). Also providing the employee-liable reimbursement program invoice in the first format improves integration of the employee-liable reimbursement program into the day-to-day recordkeeping of employer 20.

In at least one embodiment, expense management system 16 provides 1102 the invoice to employer 20 in a predefined format that is compatible with record-keeping software utilized by employer 20 and provides 1102 other data to employer 20 using a web-based interface. For example, expense management system 16 may provide 1102 employer 20 with access to a webpage. The webpage may provide 1102 employer 20 with options on how to organize the data stored by expense management system 16 associated with employer 20. For example, employer 20 may be able to organize the data to create the reports described above.

In the exemplary embodiment, expense management system 16 receives 1104 approval of at least a portion the invoice from employer 20. For example, employer 20 may approve all payments included within the invoice provided 1102 by expense management system 16. Alternatively, employer 20 may approve some of the payments included within the invoice. Once expense management system 16 receives 1104 approval of at least a portion of the invoice from employer 20, expense management system 16 automatically requests funds from employer 20 to cover the approved payments.

In the exemplary embodiment, expense management system 16 also electronically transfers 1106 funds from an employer associated account to the service providers associated with the approved payments, and/or to employees receiving direct reimbursement. More specifically, expense management system 16 electronically transfers 1106 funds to the service provider accounts associated with the approved employees, and/or to the employee accounts associated with the approved employees. As described above, when approved, a reimbursement record is included within an employee record. The reimbursement record includes the data necessary for expense management system 16 to direct payments to the service provider accounts associated with the approved employees, including a service provider account identifier. For example, expense management system 16 may provide a payment associated with first employee 42 to first service provider 30, a payment associated with second employee 44 to second service provider 32, and a payment associated with third employee 46 to third service provider 34. Furthermore, when a plurality of employees enrolled in the reimbursement program have service provider accounts with first service provider 30, expense management system 16 may provide a single payment to first service provider 30, with instructions how to allocate that payment (e.g., a list of service provider accounts in which to apply the funds, and an amount associated with each service provider account on the list). The transfer 1106 of funds includes transfers made under a direct payment option to employee accounts associated with approved employees. In the exemplary embodiment, expense management system 16 electronically transfers 1106 funds using ACH/CTX payment transactions.

In the exemplary embodiment, a plurality of employees, for example, employees 40 (shown in FIG. 1) are enrolled 422 (shown in FIG. 6) in the employee-liable expense reimbursement program offered by their employer, for example, employer 20 (shown in FIG. 1). Requests for reimbursement submitted by employees 40 are processed 432 (shown in FIG. 6) by expense management system 16 (shown in FIG. 1). Approval, by employer 20, of the requests for reimbursement, prompts expense management system 16, or alternatively, an administrator associated with expense manager 14, to create 1026 (shown in FIG. 12) a reimbursement record. Expense management system 16 periodically generates 1100 (shown in FIG. 13) an invoice based on the reimbursement records. For example, expense management system 16 may generate 1100 an invoice, once each month, for each of the service providers participating in the employee-liable expense reimbursement program (e.g., one invoice per month for each of service providers 28, shown in FIG. 1). In at least one example, each invoice includes a total amount to be paid to the corresponding service provider that month.

In the exemplary embodiment, expense management system 16 provides 1102 the invoice to employer 20. For example, the invoice may request approval from employer 20 of a $30, 425 payment to be made to first service provider 30 (shown in FIG. 1). Once expense management system 16 receives 1104 approval of this payment to first service provider 30, expense management system 16 requests that $30, 425 be funded, by employer 20, to a financial account associated with expense manager 14 within a predefined time period (e.g., two business days). In this example, expense management system 16 also creates and transmits an ACH transaction for $30, 425 to first service provider 30, with CTX transaction details that include instructions for first service provider 30 as to which sub-accounts to apply the funds, and the amount associated with each sub-account. In other words, the CTX transaction details created by expense management system 16 appear to first service provider 30 as if expense management system 16 is paying one invoice for each of employees 40 (e.g., possibly hundreds of individual invoices). In response to the ACH/CTX transaction submitted by expense management system 16, first service provider 30 applies a payment credit equal to the amount specified in the ACH/CTX transaction to each employee's personal account (i.e., their service provider account with first service provider 30). Any problem applying the funds is communicated by first service provider 30 to expense management system 16.

Described herein are exemplary methods and systems for managing payment of employee-liable expenses. An expense management system administers a periodic distribution of payments directly to a service provider, and more specifically, directly to an account with the service provider associated with an employee. Optionally, payments are made directly to employees for employee-liable expenses associated with services provided by the service provider. More specifically, the methods and systems described herein allow administrators to configure various reimbursement levels based on policies developed by an employer. The administrators electronically invite employees to participate in the employer's employee-liable device reimbursement program. Employees are directed through an online questionnaire process for the purposes of determining eligibility, determining reimbursement level, and gaining management approval. The methods and systems described herein facilitate administering a periodic distribution of payments directly to the service providers electronically to approved employee-liable accounts via ACH/CTX payment transactions. The methods and systems described herein also facilitate reporting on the status of payments, what service providers or employees were paid, how much each employee has paid on their behalf, where within the employer each payment is accounted for, and other reporting functions necessary for auditing the validity of the expense. An inventory of devices is provided and a periodic validation of employee reimbursed devices and accounts is performed. An expense manager may electronically request funds from the employer and provide an automated general ledger upload file for recording employee-liable device payments. The systems and methods described herein also match employee-liable device payments to human resource records to ensure payments are made only for valid employees.

The methods and systems described herein facilitate efficient and economical payment of employee-liable expenses. Exemplary embodiments of methods and systems are described and/or illustrated herein in detail. The methods and systems are not limited to the specific embodiments described herein, but rather, components of each system, as well as steps of each method, may be utilized independently and separately from other components and steps described herein. Each component, and each method step, can also be used in combination with other components and/or method steps.

When introducing elements/components/etc. of the methods and systems described and/or illustrated herein, the articles "a", "an", "the", and "said" are intended to mean that there are one or more of the element(s)/component(s)/etc. The terms "comprising", "including", and "having" are intended to be inclusive and mean that there may be additional element(s)/component(s)/etc. other than the listed element(s)/component(s)/etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer system for generating a plurality of data structures, the computer system comprising:
   a memory device having stored therein, for each of a plurality of individuals, (i) an identifier associated with one of a plurality of financial institutions, each financial institution associated with a data format for single deposits into multiple accounts, (ii) an identifier for a personal account associated with the individual and the identified financial institution, (iii) an identifier associated with a service provider, and (iv) an identifier for a service account associated with the identified service provider, wherein the service account is configured by the service provider for billing to the individual; and
   a processor operable to execute instructions stored in the memory device causing the processor to:
      generate a first data file associated with a predefined time period, wherein the first data file includes data that identifies an aggregated amount based on the service accounts to be paid by a benefit provider within the predefined time period for application to the personal accounts of the individuals associated with each respective service provider;
      provide access, via the Internet, to the first data file to a client application executing on a benefit provider computing device associated with the benefit provider, wherein the first data file is presentable to the client application in a predefined format that is compatible with record-keeping software utilized by the benefit provider;
      receive, via the Internet from the client application executing on the benefit provider computing device, approval from the benefit provider for payment on at least a portion of each of the aggregated amounts included in the first data file;
      in response to receiving the approval, provide data configured to generate a request for funds from the benefit provider equal to at least a total of the respective approved amounts included in the first data file;

generate the plurality of data structures associated with the predefined time period, each data structure corresponding to a respective financial institution, wherein each data structure includes data that (i) designates for transfer to the financial institution funds associated with the approved amounts for the individuals having personal accounts associated with the respective financial institution, and (ii) instructs the financial institution to allocate the designated funds among the personal accounts associated with the respective service provider based on the associated personal account identifier and an amount associated with each individual account, and wherein each data structure is in the data format associated with the respective financial institution for single deposits into multiple accounts; and transmit each of the plurality of data structures to the corresponding financial institution.

2. The computer system of claim 1, wherein the memory device further has stored therein, for each individual, at least one of a cost center and a geographic location assigned to the individual by the benefit provider, and wherein the computer-executable instructions further cause the processor to identify a portion of the aggregated amounts as being associated with the at least one of the cost center and the geographic location of the associated individuals.

3. The computer system of claim 1, wherein the computer-executable instructions further cause the processor to present the first data file to the benefit provider computing device in an electronic format with organize functions, the organize functions enabling the benefit provider to sort or reconfigure the provided data to facilitate review of the requested funds.

4. The computer system of claim 3, wherein the computer-executable instructions further cause the processor to provide the benefit provider computing device access to a webpage, wherein the webpage provides the benefit provider with the organize functions.

5. The computer system of claim 1, wherein the computer-executable instructions further cause the processor to present the first data file in an electronic format configured for importing into an accounting system of the benefit provider as a general ledger entry.

6. The computer system of claim 1, wherein the memory device further has stored therein, for each individual, a timing of a recurring offset payment to be made, and wherein the computer-executable instructions further cause the processor to generate the first data file based on the stored timing of the recurring payment for each individual.

7. The computer system of claim 1, wherein the computer-executable instructions further cause the processor to store the personal account identifier for at least one individual based on electronic registration data received from the at least one participating individual.

8. The computer system of claim 7, wherein the computer-executable instructions further cause the processor to request approval, via the benefit provider computing device, of the received electronic registration data.

9. The computer system of claim 1, wherein the computer-executable instructions further cause the processor to generate, by the processor, the plurality of data structures in a standard electronic payment transaction format.

10. The computer system of claim 9, further comprising electronically transferring, by the processor, funds to each financial institution in accordance with the respective data structure.

11. The computer system of claim 1, wherein the computer-executable instructions further cause the processor to:

receive, from the benefit provider computing device, a list of the plurality of individuals; and
verify stored information for at least one individual against the list.

12. The computer system of claim 11, wherein the computer-executable instructions further cause the processor to:

receive, from the benefit provider computing device, individual data associated with at least one of the plurality of individuals;
determine the amount to be paid to the personal account of the at least one individual based at least in part on the individual data; and
store the amount in the memory.

13. A computer-implemented method for generating a plurality of data structures, the method performed by a computer system including a memory device and a processor, the memory device having stored therein, for each of a plurality of individuals, (i) an identifier associated with one of a plurality of financial institutions, each financial institution associated with a data format for single deposits into multiple accounts, (ii) an identifier for a personal account associated with the individual and the identified financial institution, (iii) an identifier associated with a service provider, and (iv) an identifier for a service account associated with the identified service provider, wherein the service account is configured by the service provider for billing to the individual, the method comprising generating, by the processor a first data file associated with a predefined time period, wherein the first data file includes data that identifies an aggregated amount based on the service accounts to be paid by a benefit provider within the predefined time period for application to the personal accounts of the individuals associated with each respective service provider;
providing access, by the processor, via the Internet, to the first data file to a client application executing on a benefit provider computing device associated with the benefit provider, wherein the first data file is presentable to the client application in a predefined format that is compatible with record-keeping software utilized by the benefit provider;
receiving, by the processor, via the Internet from the client application executing on the benefit provider computing device, approval from the benefit provider for payment on at least a portion of each of the aggregated amounts included in the first data file;
in response to receiving the approval, providing data, by the processor, configured to generate a request for funds from the benefit provider equal to at least a total of the respective approved amounts included in the first data file;
generating, by the processor, the plurality of data structures associated with the predefined time period, each data structure corresponding to a respective financial institution, wherein each data structure includes data that (i) designates for transfer to the financial institution funds associated with the approved amounts for the individuals having personal accounts associated with the respective financial institution, and (ii) instructs the financial institution to allocate the designated funds among the personal accounts associated with the respective service provider based on the associated personal account identifier and an amount associated with each individual account, and wherein each data structure is in the data format associated with the respective financial institution for single deposits into multiple accounts; and transmit each of the plurality of data structures to the corresponding financial institution.

14. The computer-implemented method of claim 13, wherein the memory device further has stored therein, for each individual, at least one of a cost center and a geographic location assigned to the individual by the benefit provider, and wherein the method further comprises identifying, by the processor a portion of the aggregated amounts as being associated with the at least one of the cost center and the geographic location of the associated individuals.

15. The computer-implemented method of claim 13, further comprising presenting, by the processor, the first data file to the benefit provider computing device in an electronic format with organize functions, the organize functions enabling the benefit provider to sort or reconfigure the provided data to facilitate review of the requested funds.

16. The computer-implemented method of claim 15, further comprising providing, by the processor, the benefit provider computing device access to a webpage, wherein the webpage provides the benefit provider with the organize functions.

17. The computer-implemented method of claim 13, further comprising presenting, by the processor, the first data file in an electronic format configured for importing into an accounting system of the benefit provider as a general ledger entry.

18. The computer-implemented method of claim 13, wherein the memory device further has stored therein, for each individual, a timing of a recurring offset payment to be made, and wherein the method further comprises generating, by the processor, the first data file based on the stored timing of the recurring payment for each individual.

19. The computer-implemented method of claim 13, further comprising storing, by the processor, the personal account identifier for at least one individual based on electronic registration data received from the at least one participating individual.

20. At least one non-transitory computer-readable media having computer-executable instructions embodied thereon, wherein when executed by at least one processor in communication with a memory device having stored therein, for each of a plurality of individuals, (i) an identifier associated with one of a plurality of financial institutions, each financial institution associated with a data format for single deposits into multiple accounts, (ii) an identifier for a personal account associated with the individual and the identified financial institution, (iii) an identifier associated with a service provider, and (iv) an identifier for a service account associated with the identified service provider, wherein the service account is configured by the service provider for billing to the individual, the computer-executable instructions cause the at least one processor to:

generate a first data file associated with a predefined time period, wherein the first data file includes data that identifies an aggregated amount based on the service accounts to be paid by a benefit provider within the predefined time period for application to the personal accounts of the individuals associated with each respective service provider;

provide access, via the Internet, to the first data file to a client application executing on a benefit provider computing device associated with the benefit provider, wherein the first data file is presentable to the client application in a predefined format that is compatible with record-keeping software utilized by the benefit provider;

receive, via the Internet from the client application executing on the benefit provider computing device, approval from the benefit provider for payment on at least a portion of each of the aggregated amounts included in the first data file;

in response to receiving the approval, provide data configured to generate a request for funds from the benefit provider equal to at least a total of the respective approved amounts included in the first data file;

generate a plurality of data structures associated with the predefined time period, each data structure corresponding to a respective financial institution, wherein each data structure includes data that (i) designates for transfer to the financial institution funds associated with the approved amounts for the individuals having personal accounts associated with the respective financial institution, and (ii) instructs the financial institution to allocate the designated funds among the personal accounts associated with the respective service provider based on the associated personal account identifier and an amount associated with each individual account, and wherein each data structure is in the data format associated with the respective financial institution for single deposits into multiple accounts; and transmit each of the plurality of data structures to the corresponding financial institution.

* * * * *